US011113019B2

(12) United States Patent
Spriggs et al.

(10) Patent No.: US 11,113,019 B2
(45) Date of Patent: Sep. 7, 2021

(54) MULTI-DEVICE SELECTIVE INTEGRATION SYSTEM

(71) Applicant: Branch Banking and Trust Company, Winston-Salem, NC (US)

(72) Inventors: Matthew T. Spriggs, Raleigh, NC (US); Michael Shade, Apex, NC (US); Michael Anthony Dascola, Clayton, NC (US); Matthew Whitley, Cary, NC (US); Patricia Kinney, Cary, NC (US)

(73) Assignee: Truist Bank, Charlotte, NC (US)

( * ) Notice: Subject to any disclaimer, the term of this patent is extended or adjusted under 35 U.S.C. 154(b) by 241 days.

(21) Appl. No.: 15/356,055

(22) Filed: Nov. 18, 2016

(65) Prior Publication Data
US 2017/0139659 A1 May 18, 2017

Related U.S. Application Data

(60) Provisional application No. 62/256,969, filed on Nov. 18, 2015.

(51) Int. Cl.
*G06F 3/14* (2006.01)
*G06F 3/0482* (2013.01)
(Continued)

(52) U.S. Cl.
CPC ............ *G06F 3/1407* (2013.01); *G06F 3/048* (2013.01); *G06F 3/0481* (2013.01);
(Continued)

(58) Field of Classification Search
CPC ............ G09G 5/00; G09G 2340/0464; G09G 2340/14; G06F 3/1407; G06F 3/04886;
(Continued)

(56) References Cited

U.S. PATENT DOCUMENTS 8,719,132 B1    5/2014  Diggdon et al.
10,303,347 B1 *  5/2019  Casale ................. G06Q 10/103
(Continued)

*Primary Examiner* — Tan H Tran
(74) *Attorney, Agent, or Firm* — Kilpatrick Townsend & Stockton LLP

(57) ABSTRACT

A device identifier for a user device may be identified from multiple device identifiers corresponding to multiple user devices. The device identifier is stored in a database in a memory location of a first set of memory locations including the device identifiers. The memory location may be associated with a separate memory location including a user identifier corresponding to the user. Application information is retrieved for web-based applications and stored in a second set of memory locations associated with the memory location including the device identifier. Customization information is retrieved for the web-based applications. The customization information includes location information for the web-based applications and corresponding secure information. A request for the secure information may be made to different systems and corresponding databases including the secure user information. A dashboard user interface may be generated that positions the web-based applications and corresponding secure information based on the database associations.

20 Claims, 15 Drawing Sheets

(51) Int. Cl.
*G06F 3/0484* (2013.01)
*G06F 17/30* (2006.01)
*G06F 16/24* (2019.01)
*G06F 3/0488* (2013.01)
*G09G 5/00* (2006.01)
*G06F 9/451* (2018.01)
*G06F 3/0481* (2013.01)
*G06F 3/048* (2013.01)

(52) U.S. Cl.
CPC .......... *G06F 3/0482* (2013.01); *G06F 3/0484* (2013.01); *G06F 3/04817* (2013.01); *G06F 3/04842* (2013.01); *G06F 3/04886* (2013.01); *G06F 9/451* (2018.02); *G06F 16/24* (2019.01); *G09G 5/00* (2013.01); *G06F 2203/04803* (2013.01); *G09G 2340/0464* (2013.01); *G09G 2340/14* (2013.01)

(58) Field of Classification Search
CPC ............... G06F 17/30386; G06F 16/24; G06F 2203/04803; G06F 3/0482; G06F 3/0484; G06F 3/0481; G06F 9/451; G06F 3/048; G06F 3/04817; G06F 3/04842
See application file for complete search history.

(56) References Cited

U.S. PATENT DOCUMENTS

| | | | |
|---|---|---|---|
| 10,510,082 B1* | 12/2019 | Zimmerman | G06Q 20/4014 |
| 2005/0108406 A1* | 5/2005 | Lee | G06F 17/30867 |
| | | | 709/228 |
| 2009/0249359 A1* | 10/2009 | Gaunter | G06F 9/454 |
| | | | 719/315 |
| 2012/0144332 A1* | 6/2012 | Sola | G06F 8/34 |
| | | | 715/769 |
| 2012/0212501 A1* | 8/2012 | Berkland | G06F 9/451 |
| | | | 345/593 |
| 2013/0024760 A1* | 1/2013 | Vogel | G06F 9/44505 |
| | | | 715/212 |
| 2013/0346320 A1* | 12/2013 | Jin | G06Q 40/02 |
| | | | 705/76 |
| 2014/0032386 A1* | 1/2014 | Jain | G06Q 40/02 |
| | | | 705/35 |
| 2015/0178034 A1* | 6/2015 | Penilla | G06Q 20/18 |
| | | | 345/1.1 |
| 2016/0364695 A1* | 12/2016 | Patterson | G06Q 10/1093 |

* cited by examiner

MULTI-DEVICE SELECTIVE INTEGRATION SYSTEM

CROSS-REFERENCE TO RELATED APPLICATION

This claims priority to U.S. Provisional Application Ser. No. 62/256,969, filed Nov. 18, 2015 and titled "Multi-Device Selective Integration System," the contents of which are incorporated herein by reference.

TECHNICAL FIELD

The present disclosure relates to database integration systems, and more particularly, though not necessarily exclusively, to device-specific selective integration of secure information from multiple disparate databases.

BACKGROUND

Web-based platforms may provide users the ability to access secure and personal information from a user device connected to a web network. Different types of user devices may be connected to the web network to access the same web-based platforms. But, differences in computing power, functionality, size, and other features of different user devices may create difficulties in applying the same interface criteria to different types of user devices. Also, the differences between the features in various user devices may cause users to utilize the different devices for different purposes based on a device's specific features and limitations. For example, a user may utilize a smaller user device, such as a smartphone or smartwatch, for quick access to summarized information and reserve viewing detailed information for user devices having a larger viewing screen, such as personal computers.

SUMMARY

In certain aspects of the present disclosure, an integration system may include a processor coupled to a database having memory locations. The database may also include a memory device accessible to the processor and comprising instructions that are executable by the processor to cause the processor to identify a device identifier from multiple device identifiers corresponding to multiple user devices. The device identifier may correspond to the user device and be stored in a memory location of the memory locations. The memory location may be included in a first set of memory locations including the device identifiers. The first set of memory locations may be associated with a separate memory location comprising a user identifier corresponding to a single user of the user devices. The instructions may also cause the processor to retrieve application information for web-based applications. The application information may be stored in a second set of memory locations that is associated with the memory location including the device identifier. The instructions may also cause the processor to retrieve customization information stored in a third set of memory locations that is associated with the second set of memory locations. The instructions may also cause the processor to request the secure user information from different systems. The instructions may also cause the processor to generate a dashboard user interface including web-based applications including the secure user information. The web-based applications and the secure user information may be positioned based on associations between the memory locations in the database.

In additional aspects, a method may include receiving a user request to receive secure user information stored in remote databases hosted by remote application systems. The method may also include identifying a device identifier multiple device identifiers corresponding to multiple user devices. The method may also include retrieving application information for web-based applications. The application information may be stored in a second set of memory locations that is associated with a memory location including the device identifier. The method may also include retrieving customization information stored in a third set of memory locations that is associated with the second set of memory locations. The method may also include requesting the secure user information and generating a dashboard user interface for display on the user device that includes the secure user information. The web-based applications and the secure user information may be positioned based on associations between the memory locations in the database.

In further aspects, a system may include an integration server device communicatively coupled to different application systems including corresponding databases. The system may also include a centralized database coupled to the integration server device and comprising memory locations for storing: (i) a user identifier corresponding to a user of multiple user devices that are usable to access the integration server device via a network; (ii) device identifiers corresponding to the user devices; (iii) application information corresponding to the different applications and useable to generate web-based applications including secure user information stored in the corresponding databases; and (iv) customization information identifying a location on a dashboard user interface to display each web-based application and, for each web-based application, a position within the web-based application for the secure user information corresponding to the web-based application. The associations between the memory locations may be usable by a processor of the integration server device to create the dashboard user interface in a format that is dependent on which user device of the user devices requests access to the dashboard user interface

DETAILED DESCRIPTION

Figure 1:
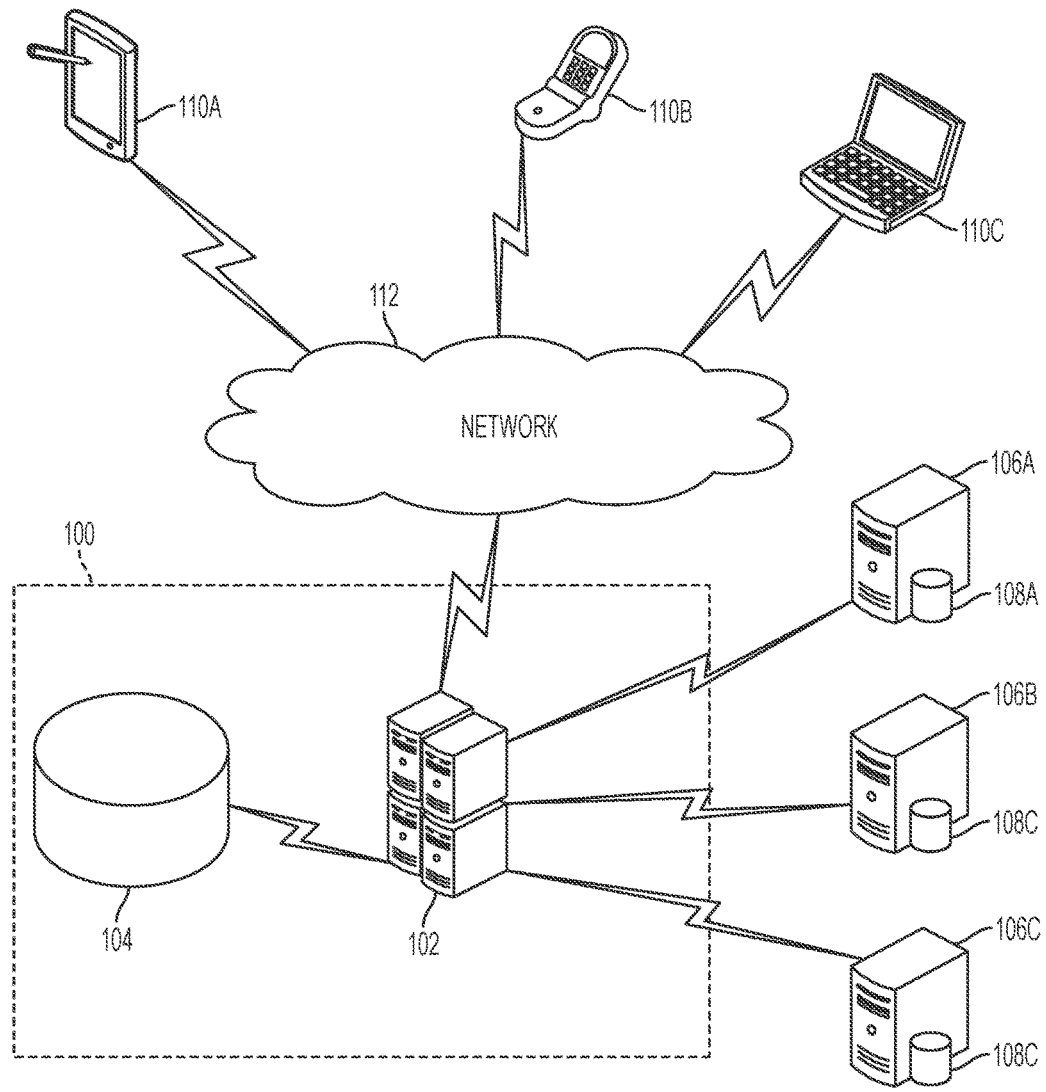
FIG. 1 is a schematic diagram of an example of an integration system for selectively integrating secure information from multiple disparate databases according to one aspect of the present disclosure.

Certain aspects and features relate to integrating secure information from disparate databases for selective display of the secure information on a user device in a user-specific or device-specific format using associations between memory locations in a centralized database. The centralized database may include memory locations for storing information that may be used to generate a dashboard user interface. The dashboard user interface may include a number of web-based applications displaying different types of secure information stored in the disparate databases. In some aspects, the disparate databases correspond to different application systems and store secure user information related to their respective application system. The information stored in the centralized databases my include: (i) user-identifying information; (ii) device-identifying information corresponding to user devices from which the user may view the secure information; (iii) application information corresponding to different web-based applications, and (iv) customization information corresponding to user-defined parameters for displaying the web-based application and the secure information stored therein. The memory locations may be associated in the centralized database in a way that identifies, for each device corresponding to the user, the databases from which the secure information is retrieved and the positions of the retrieved secure information on the dashboard user interface.

An integration system including a centralized database according to some aspects of the present disclosure may be communicatively coupled to the disparate database devices. The integration system may determine a device identifier of a user device from which a user is accessing the integration system. The integration system may also identify application information stored in a database based on its association with the device identifier in the database. For example, the application information may be stored in memory locations. The memory locations storing the application information may be associated with another memory location that includes device-identifying information corresponding to the user device. The application information may identify the remote databases or application systems including the secure user information for display on a display screen of the user device used to access the integration system. The integration system may generate different dashboard user interfaces including different secure information for different user devices accessing the integration system. Similarly, the positioning of the secure information may also differ depending on the user device used to access the integration system. The positions of the secure information may be determined based on customization information stored in the centralized database. The database memory locations including the customization information may be associated with memory locations including the application information. In some aspects, the customization information may include user input defining where to position the information based on the database in which the secure information is stored and the type of information stored in the database.

An integration system according to certain aspects of the present disclosure may allow the same user to access a dashboard user interface from multiple user devices (e.g., mobile phones, tablet applications, laptop computers, etc.). In some aspects, the integration system can selectively share the web-based applications included on the user's dashboard user interface based on the device from which the user is accessing the integration system. For example, the same web-based applications may automatically appear on some or all other user devices from which the user accesses the integration system in response to a selection by the user to display the web-based application on one of the user devices. In some aspects, elected web-based applications may be device-specific and a web-based application or set of web-based applications may appear on one user device with a different selected web-based application or set of web-based applications appearing on a different device. Determining which web-based application appears on the dashboard of which user device may depend on the web-based application itself, the user's preference, or the type of user device.

The web-based applications displayed on dashboard user interfaces according to some aspects of the present disclosure may include transient or auxiliary applications relating to one or more of the application systems coupled to the integration system. For example, an application system may provide the user with secure information about a specific account held by the user. A web-based application corresponding to the application system may display secure information related to the account on the dashboard user interface. The account information may be integrated with secure information related to another application system via another web-based application on the dashboard. The user may determine which web-based applications are displayed on the dashboard and, in some aspects, where on the dashboard to display the information. In some instances, the user may also determine specific secure information related to a web-based application (and the corresponding application system) that should be displayed by the web-based application, either substantively and quantitatively. The user may also determine how the information should be displayed (e.g., order of appearance) within the web-based application. Additional customizable components of the dashboard may include personalization information (e.g., a user image and moniker) and theme information (e.g., colors displayed on the dashboard) selected by the user.

In some aspects, an integration system may be used by client service organizations to allow clients to view secure information related to the client from an increasing number of platforms. For example, a host may use the integration system to provide a dashboard accessible to its clients from any user device on which its clients may wish to view their secure information. The integration system may allow the client to view a variety of different information and options by integrating application systems related to different types of secure information stored in different locations on a single dashboard user interface. The application systems may individually secure the information stored in their respective databases using different authentication techniques. For example, the application systems may use different usernames, passwords, or other authentication information to authenticate users to access the information when a user accesses an application system directly. An integration system according to some aspects allows the secure information from each of the different application systems to be displayed in a single interface without separately requiring authentication on each application system. The associations between the memory locations in the centralized database allow the user to be identified and authenticated based on the user device from which the user is accessing the integration system. Also, the associations further allow the integrated secure information to be displayed in a manner that the user prefers for viewing such information based on the given device.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 2:
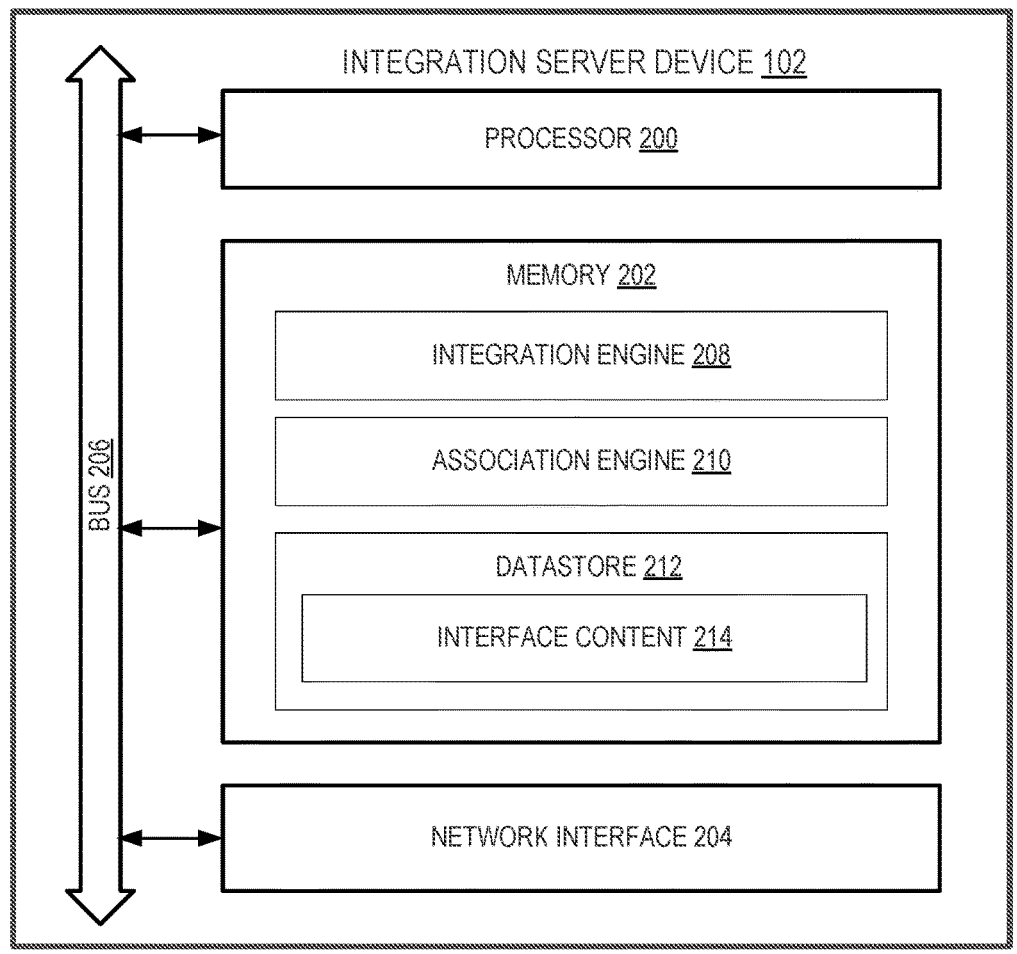
FIG. 2 is a block diagram of an integration server device of the integration system of FIG. 1 according to one aspect of the present disclosure.

FIG. 1 is a schematic diagram of an example of an integration system 100 for selectively integrating secure information from multiple disparate databases according to one aspect of the present disclosure. The integration system 100 includes an integration server device 102 communicatively coupled to a database device 104. The integration server device 102 may include a processing device or other device for integrating secure information from one or more disparate application systems, such as application systems 106A, 106B, 106C, on a dashboard user interface. The information stored in the database device 104 may be used to generate the dashboard user interface in a manner that is specific to the user of the secure information being displayed on the dashboard user interface and specific to the user device from which the user is accessing the dashboard user interface. In some aspects, the database device 104 is separate from the integration server device 102 as shown in FIG. 2. In other aspects, the database device 104 is integral to the integration server device 102. The database device 104 may include a single database or multiple databases.

The integration server device 102 may be communicatively coupled to the application system 106A, 106B, 106C. The integration server device 102 may retrieve the secure information from one or more of the application systems 106A, 106B, 106C. The application systems 106A, 106B, 106C include corresponding database devices 108A, 108B, 108C for storing the secure information. The secure information stored in the database devices 108A, 108B, 108C may include user information that is sensitive, confidential, or otherwise personal to the user. In some aspects, the secure information may be stored as raw data. In additional and alternative aspects, the secure information may be stored as processed data, including reports, analyses, spreadsheets, tables, or other data using information that is personal to one or more users.

The application systems 106A, 106B, 106C and the corresponding database devices 108A, 108B, 108C may be associated with web-based applications that are displayable on a dashboard user interface generated by the integration system. For example, a web-based application may include an auxiliary application for displaying secure information stored in the database device 108A, 108B, 108C in a predetermined manner defined by the application. In some aspects, the web-based applications may allow the user to interact with the application systems 106A, 106B, 106C directly from the dashboard user interface without logging into or otherwise navigating to the application systems 106A, 106B, 106C. For example, a web-based application corresponding to an application system 106A, 106B, 106C for user transactions may display secure information corresponding to source accounts and donor accounts for initiating a monetary transaction. The web-based application may allow the user to make a transaction from the dashboard user interface through interactions (e.g., user selections) with the web-based application displayed on the dashboard user interface.

User devices 110A, 110B, 110C may access the integration server device 102 via a network 112, such as the Internet. The integration server device 102 may generate the dashboard user interfaces including secure information and transmit the information to a user device 110A, 110B, 110C for display on a display screen of the user device 110A, 110B, 110C. In some aspects, users of the user devices 110A, 110B, 110C may be clients of a host of the integration system 100. The integration server device 102 may manage secure information associated with the user and integrate the secure information into a single dashboard user interface from multiple different sources (e.g., database devices 108A, 108B, 108C).

The user devices 110A, 110B, 110C include computing devices having processing devices or other computing device and display screens for displaying the database user interfaces generated by the integration system 100. In some aspects, a single user may access the integration server device 102 from different user devices 110A, 110B, 110C. For example, in FIG. 1, user device 110A corresponds to a tablet device, user device 110B corresponds to a mobile device (e.g., a smartphone, wearable device, personal digital assistant, etc.), and user device 110C corresponds to a computer (e.g., a laptop, a desktop, etc.). Although a tablet device, a mobile device, and a computer are shown in FIG. 1, the user devices 110A, 110B, 110C may include any computing devices or combination of computing devices without departing from the scope of the present disclosure. Similarly, though only three application systems 106A, 106B, 106C and three user devices 110A, 110B, 110C are shown, the integration server device 102 may be communicatively coupled to any number of application systems and any number of user devices, including one, without departing from the scope of the present disclosure. Also, in some aspects, the integration server device 102 is communicatively coupled to the application systems 106A, 106B, 106C via the network 112.

FIG. 2 is a block diagram of the integration server device 102 of the integration system of FIG. 1 that may implement certain aspects of the present disclosure. The integration server device 102 includes a processor 200, memory 202, and a network interface 204 connected by a bus 206. The processor 200 may execute instructions stored in the memory 202 to perform operations of the integration server device 102. The processor 200 may include a single processing device or multiple processing devices. Non-limiting examples of the processor 200 include a field-programmable gate array ("FPGA"), an application-specific integrated circuit ("ASIC"), and a microprocessor. The memory 202 includes a storage device that retains information when powered off. Non-limiting examples of the memory 202 include electrically erasable and programmable read-only memory, a flash memory, or any other type of non-volatile memory.

In some examples, at least a portion of the memory 202 may include a computer-readable medium from which the processor 200 can access and execute instructions of the memory 202. A computer-readable medium may include electrical, optical, magnetic, or other storage devices capable of providing the processor 200 with computer-readable instructions or other program code. Non-limiting examples of a computer-readable medium include magnetic disks, memory chips, read-only memory, random-access memory, an ASIC, a configured processor, optical storage, or any other medium from which the processor 200 may read instructions. The instructions may include processor-specific instructions generated by a compiler or an interpreter from code written in any suitable computer-programming language, including, for example, C, C++, C#, COBOL, Java, etc.

The instructions include one or more applications for instructing the processor 200 to perform the functions of the integration server device 102. In some aspects, the instructions include an integration engine 208 and an association engine 210, each including one or more algorithms executable by the processor 200. For example, integration engine 208 may include algorithms or other instructions to cause the processor 200 to create and store information in the memory locations of the database device 104 of FIG. 1, identify the location of secure information stored in the database devices 108A, 108B, 108C based on the information stored in the memory locations, retrieve the secure information therefrom, and generate dashboard user interfaces integrating the secure information from the database devices 108A, 108B, 108C. The association engine 210 may create the associations between the memory locations of the database device 104 of FIG. 1 and determine in which memory locations to store the information such that associations between the information are formed in the database device 104.

The memory 202 also includes a datastore 212 in which content and data may be stored. For example, the datastore 212 include interface content 214 corresponding to dashboard user interface templates and web components (e.g., logos, icons, and other web image files), instructions, and other devices for generating the dashboard user interfaces. In some aspects, the dashboard user interfaces generated using the interface content 216 may be displayed on a website hosted by the integration system 100 of FIG. 1 to allow a user to view a variety of different types of secure information in a single location. Although the interface content 214 is shown as stored in the datastore 212 of the memory 202, the interface content 214 may be similarly stored in the database device 104 of FIG. 1 without departing from the scope of the present disclosure.

The network interface 204 may include a network card or other device for communicatively coupling the integration system 100 of FIG. 1 to a network (e.g., network 112 of FIG. 1). For example, the network interface 204 may allow user devices, such as the user devices 110A, 110B, 110C, to access the integration server device 102 to receive user interfaces that allow a user to access, view, or modify secure information. The network interface 204 may also couple the integration system 100 to the network 112 of FIG. 1 to allow information and data to be transmitted between the integration system 100 and the user devices 110A, 110B, 110C via the network. In some aspects, the network interface 204 may also include allow for communication between the integration system 100 and the application systems 106A, 106B, 106C via a network.

Figure 3:
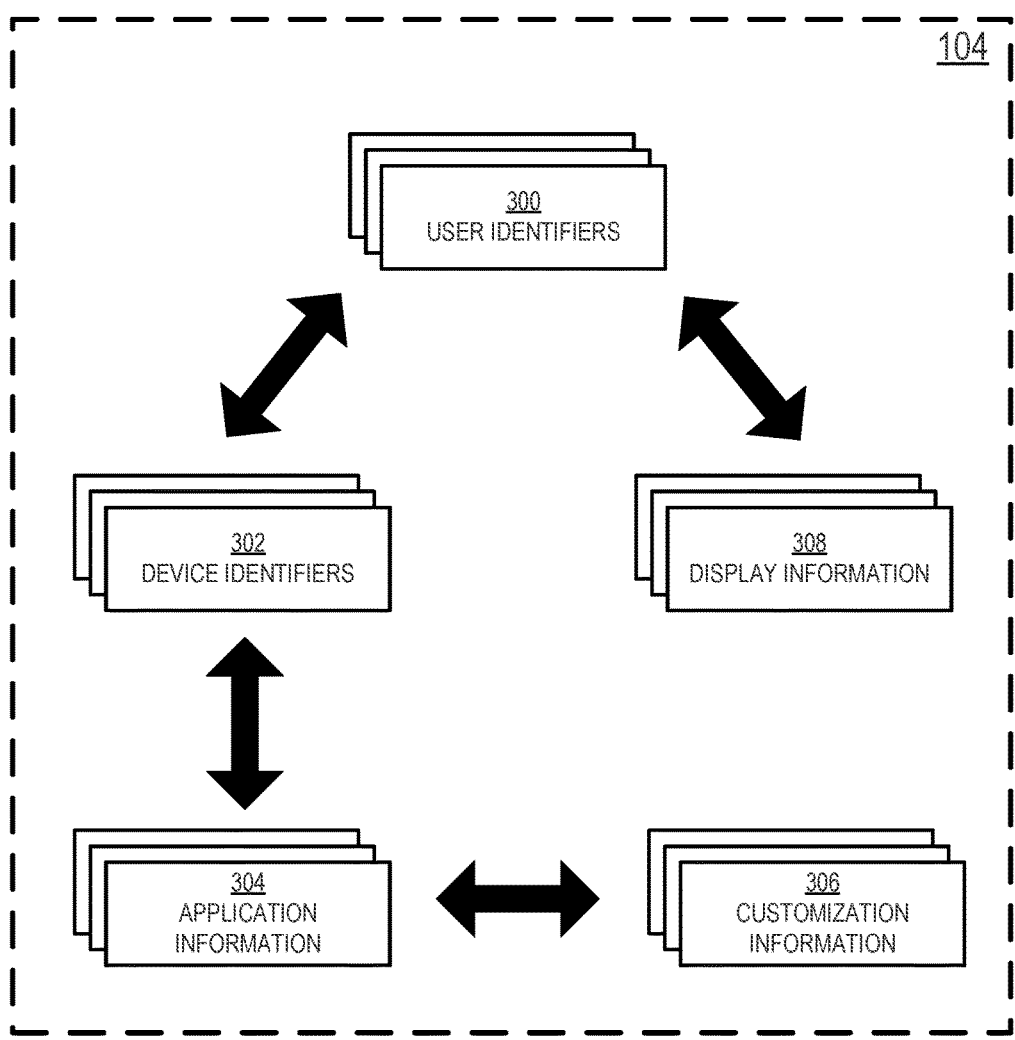
FIG. 3 is a block diagram of memory locations in a database device of the integration system of FIG. 1 according to one aspect of the present disclosure.
Figure 4:
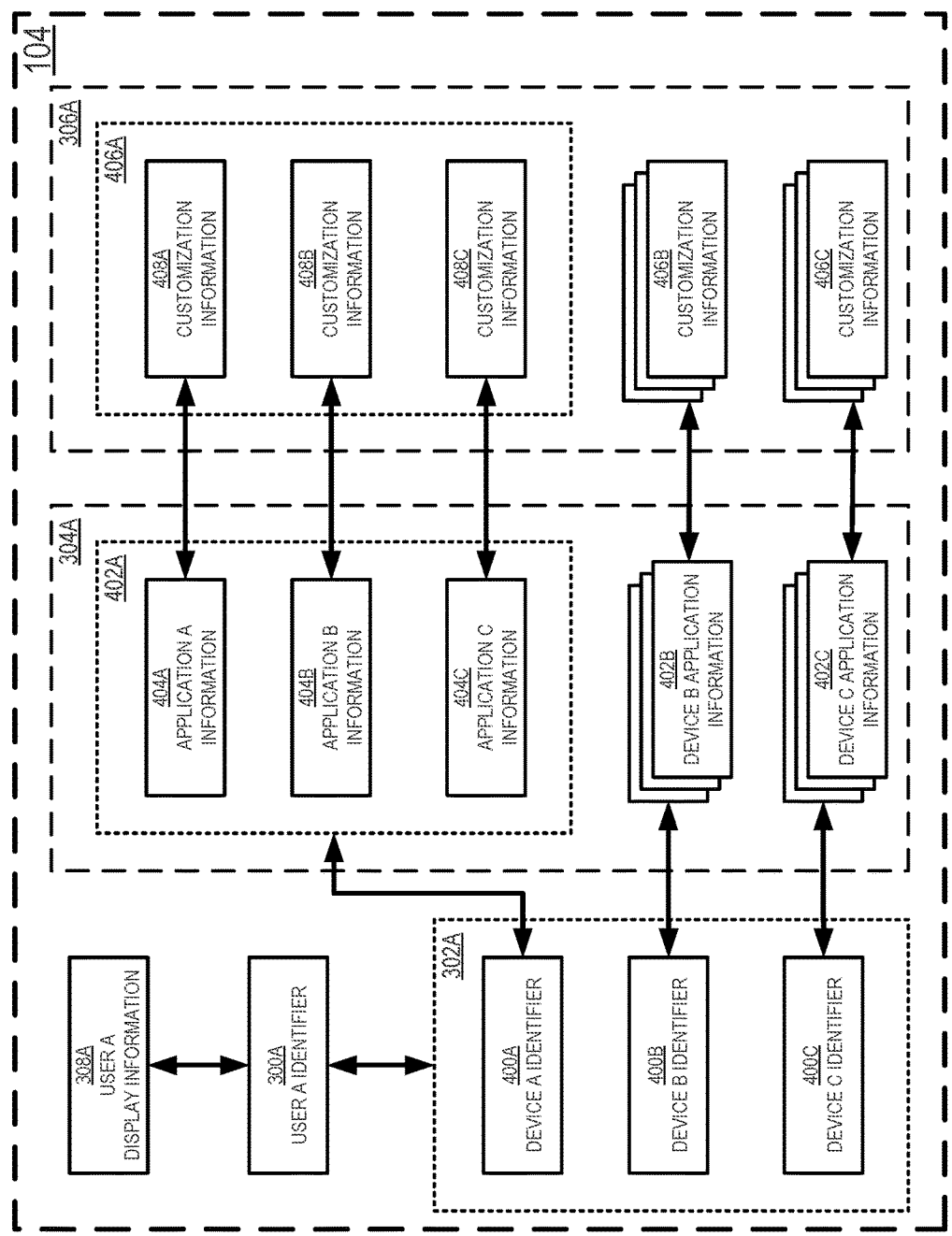
FIG. 4 is a block diagram of a detailed view of the memory locations of FIG. 3 according to one aspect of the present disclosure.

FIGS. 3 and 4 show memory locations of the database device 104, associations between the memory locations, and examples of information that may be stored in each of the memory locations according to some aspects of the present disclosure. In FIG. 3, the database device 104 includes memory locations 300, 302, 304, 306. Memory location 300 includes user identifiers. The user identifiers may include information corresponding to the identity of users of the user devices 110A, 110B, 110C. A user may be a client, account holder, or member of the host party of the integration system 100 of FIG. 1. In some aspects, a user identifier stored each of the memory locations 300 includes a unique set of alphanumeric characters, such as an online banking ("OLB") number assigned to clients to distinguish account holders of each account managed by a host party. In other aspects, the user identifiers include a unique set of alphanumeric characters provided by or issued to each user, including, but not limited to, social security numbers, personal identification numbers ("PINs"), email addresses, usernames, or passwords.

The memory locations 302 include device identifiers. In some aspects, the device identifiers include a unique set of alphanumeric characters assigned or corresponding to user devices accessing the integration server device 102 of FIG. 1, including, but not limited to, serial numbers, device identification numbers, or token codes generated by a token or other component of the user devices 110A, 110B, 110C that was previously transmitted to the user devices 110A, 110B, 110C for future attempts to authenticate the user devices 110A, 110B, 110C.

The memory locations 304 include application information. In some aspects, the application information may include information corresponding to the application systems 106A, 106B, 106C communicatively coupled to the integration server device 102 of FIG. 1. The application information may identify the application system 106A, 106B, 106C or the corresponding database device 108A, 108B, 108C associated with each application system 106A, 106B, 106C. For example, the application information may include an application identifier that corresponds to the application system 106A, 106B, 106C to which the application information corresponds. In some aspects, the application information may also include algorithms or instructions, such as programming code, for implementing a web-based applications corresponding to the application systems 106A, 106B, 106C for displaying the secure information in the database devices 108A, 108B, 108C.

The memory locations 306 include customization information. In some aspects, the customization information may include information identifying the position or coordinate information for each web-based application generated from the application information on a dashboard user interface. The customization information may also include position, coordinate, or ordering information for different types of secure information presented on each web-based application. In some aspects, at least a portion of the customization information may be based on user input. In further aspects, at least a portion of the customization information may include default information for positioning components of the dashboard user interface based on the type of user device 110A, 110б, 110C accessing the integration server device 102.

The memory locations 308 include display information. The display information may include additional customization information that is user-specific. For example, the display information may include customized web components (e.g., color scheme, photos, name, logos, background images, etc.) or other information that may be applied to each dashboard user interface generated by the integration server device 102 for a particular user. In some aspects, at least a portion of the display information may be based on user input. In further aspects, at least a portion of the display information may include default information or information generated from known or stored information corresponding to a user. Different information may be stored in a manner such that the information is associated in the database device 104. For example, the arrows between the memory locations 300, 302, 304, 306 in FIG. 3 represent database associations between the memory locations 300, 302, 304, 306. The memory locations 302 including the device identifiers may be associated with the memory locations 300 including the user identifiers. The memory locations 304 including the application information may be associated with the memory locations 302. The memory locations 306 including the customization information may be associated with the memory locations 304. In some aspects, a single memory location may be associated with another single memory location in the database device 104. In further aspects, a single memory location may be associated with multiple memory locations in the database device 104. In some aspects, one or more memory locations may be associated via a relational table or matrix having rows or columns that are associated, or otherwise linked. In additional and alternative aspects, the memory locations, or the information included therein, may include one or more markers, objects, or other associating devices to link information stored in different memory locations.

FIG. 4 shows a zoomed in and expanded view of the database associations between the information described in FIG. 3 for a single user, User A. Memory location 300A includes a user identifier for User A. Memory location 300A may be included in the set of memory locations 300 described in FIG. 3. The memory location 300A is associated with a set of memory locations 302A. The set of memory locations 302A may be included in the set of memory locations 302 of FIG. 3. The memory locations 302A include memory locations 400A, 400B, 400C including device identifiers for different user devices from which User A has attempted to access the integration server device 102. For example, memory location 400A may include a device identifier corresponding to a first user device of User A (e.g., Device A), memory location 400B may include a device identifier corresponding to a second user device of User A (e.g., Device B), and memory location 400C may include a device identifier corresponding to a third user device of User A (e.g., Device C).

The memory location 302A is associated in the database device 104 with memory location 304A. Memory location 304A corresponds to a set of memory locations within the memory locations 304 of FIG. 3. The memory locations 304A include memory locations 402A, 402B, 402C. The memory locations 402A are associated with the memory location 400A including the device identifier for a first user device of User A. Similarly, memory locations 402B, 402C are associated with memory locations 400B, 400C, respectively. The memory locations 402A include memory locations 404A, 404B, 404C. Memory location 404A includes application information for a first application (e.g., Application A) associated with the first user device of User A. Memory location 404B includes application information for a second application (e.g., Application B) associated with the first user device. Memory location 404C includes application information for a third application (e.g., Application C) associated with the first user device. The associations between the memory locations 400A and memory locations 402A may associate the applications associated with the application stored within the memory locations 402A with the first user device such that a dashboard user interface displayed on first user interface may include web-based applications corresponding to Applications A, B, C. The associations may also inform the integration server device 102 from which application systems 106A, 106B, 106C to retrieve the secure information for the dashboard user interface.

Each memory location including application information (e.g., memory locations 402A, 402B, 402C) is associated with a memory location that may include customization information corresponding to how the web-based application corresponding to the application information should be displayed. For example, the memory locations 402A including the application information for Device A is associated with the memory locations in memory area 406A. Similarly, the memory locations 402B, 402C are associated with the memory locations in memory areas 406B, 406C, respectively. Memory area 406A includes memory locations 408A, 408B, 408C. Memory location 408A is associated with memory location 404A and includes customization corresponding to Application A. Memory location 408B is associated with memory location 404B and includes customization information corresponding to Application B. Memory location 408C is associated with memory location 404C and includes customization information corresponding to Application C. Memory location 308A may be included in the memory locations 308 of FIG. 3 and include display information associated with User A.

Although FIG. 4 identifies information stored in the memory locations corresponding to specific users, user devices, and applications, additional or different memory locations may include one or more of the same user information. For example, the application information for Application B stored in memory location 404B may also be stored in a memory location of the memory locations 402C for Device C of User A. Similarly, although only specific associations are shown, one or more of the memory locations may be further associated with additional memory locations not shown to allow the same information to be associated with different users or user devices. In this manner, the web-based applications included on the dashboard user interface and the positioning of the web-based applications and the secure information displayed therein may be selectively shared across multiple different user devices.

Figure 5:
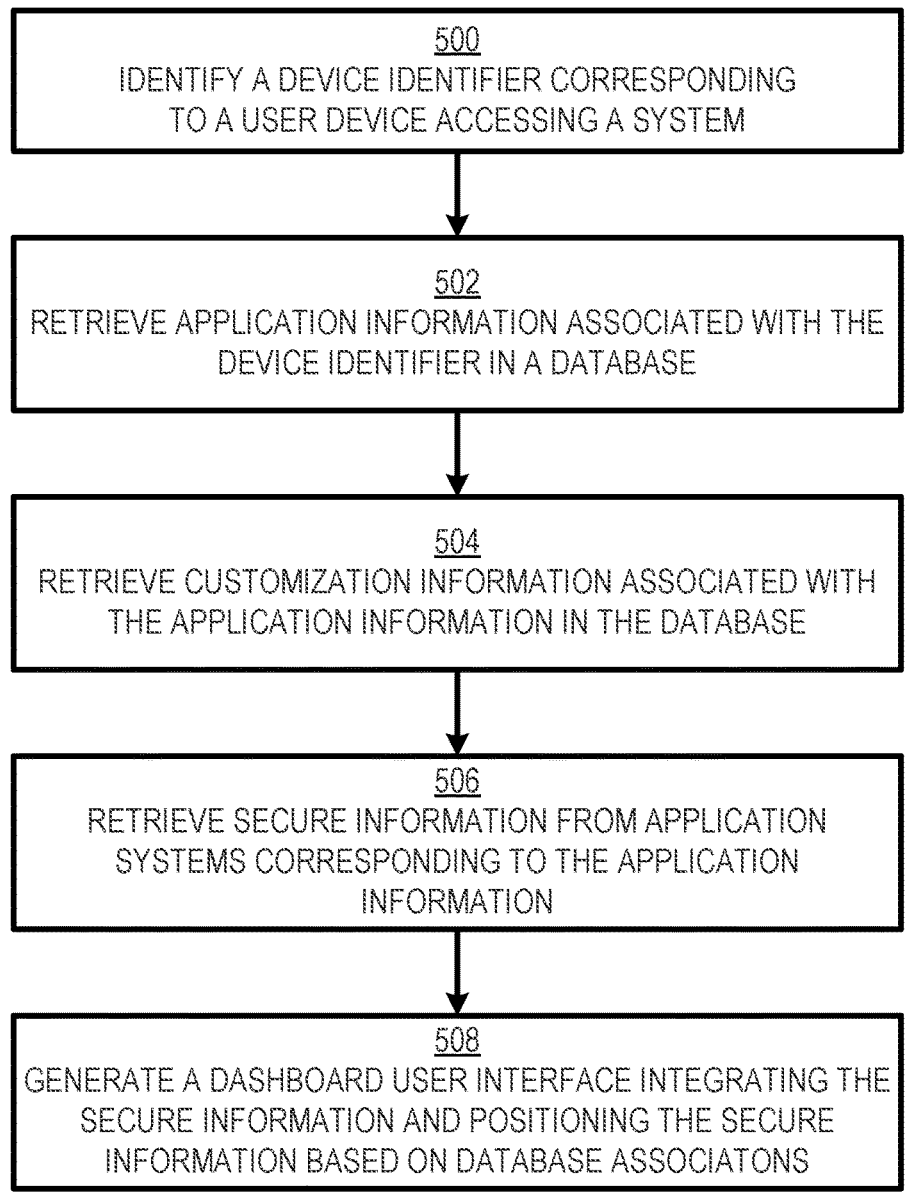
FIG. 5 is a flow chart of an example of a process for generating a dashboard user interface displaying secure information from multiple disparate databases according to one aspect of the present disclosure.

FIG. 5 is a flow chart of an example of a process for generating a dashboard user interface displaying secure information from multiple disparate databases according to one aspect of the present disclosure. The process is described with respect to the systems and components of FIGS. 1-4, though other implementations are possible without departing from the scope of the present disclosure.

In block 500, a device identifier is identified. The device identifier may correspond to the user device accessing the integration system 100. In some aspects, the device identifier may be transmitted to the integration server device 102 with a request to access the integration system 100. For example, the device identifier may include a token code authenticating the user based on an association between the device identifier and a user identifier in the database. The integration server device 102 may receive the device identifier and compare it to device identifiers stored in the memory locations 302 to determine a match. Integration server device 102 may then authenticate the user by identifying a user identifier associated with the user. For example, the device identifier may correspond to Device A and be stored in memory location 400A as described in FIG. 4. The integration server device 102 may authenticate User A based on the association between the memory location 400A and the memory location 300A including a user identifier corresponding to User A. In other aspects, the device identifier may also be used to determine how to generate and format a dashboard user interface based on additional memory locations associated with the memory location including the device identifier in the database.

In block 502, application information associated with the device identifier is retrieved. In some aspects, the application information is retrieved based on the database association between the memory locations storing the application information and the device identifier identified in block 500. Returning to the example of the device identifier corresponding to Device A and being stored in memory location 400A as described in FIG. 4, the integration server device 102 may identify additional memory locations associated with the memory location 400A and including application information. For example, in FIG. 4, the memory location 400A is associated with memory locations 402A including application information. The associations between the memory locations 400A, 402A may inform the integration server device 102 which web-based applications should be included on a dashboard user interface generated for the user device, Device A. For example, the memory locations 402A include application information for Applications A, B, and C. The integration server device 102 may determine that web-based applications corresponding to Applications A, B, and C should be included on the dashboard user interface.

In block 504, customization information associated with the application information is retrieved. The customization information may include information on how to format the secure information corresponding to the web-based applications displayed on the dashboard user interface. For example, the customization information may include information regarding the position on the dashboard user interface in which to place each web-based application on the dashboard user interface. The customization information may also include information regarding the position or order within each web-based application on the dashboard user interface to display the secure information for the application. In some aspects, the position or der may be determined based on a type identifier associated with the secure information and corresponding to the type of secure information. In some aspects, the secure information may be stored in a database device 108A, 108B, 108C based on its type. In other aspects, a database device 108A, 108B, 108C may include secure information corresponding to various types.

In some aspects, the customization information associated with the application information may be identified based on the database associations. For example, the customization information stored in memory locations of memory area 406A may be identified and retrieved in response to the application information stored in memory locations 402A being retrieved based on the associations between the memory locations 402A and those in memory area 406A in the database device 104.

In block 506, secure information corresponding to the application information is retrieved. The secure information may be stored in disparate databases of disparate application systems (e.g., database devices 108A, 108B, 108C of application systems 106A, 106B, 106C, respectively). The appropriate application systems and database devices including the secure information corresponding to the applications may be identified and retrieved based on the application information. For example, the application information may correspond to specific applications, such as Applications A, B, and C. Based on the application information, the integration server device 102 may determine the application systems 106A, 106B, 106C and corresponding database devices 108A, 108B, 108C associated with the Applications A, B, and C and retrieve the secure information corresponding to the applications.

In block 508, a dashboard user interface is generated. The dashboard user interface may be generated by the integration server device 102 to integrate the secure information retrieved from different database devices 108A, 108B, 108C into a single user interface. The dashboard user interface may be generated based on the database associations. For example, the web-based applications included on the dashboard user interface may correspond to application information stored in memory locations in the database device 104 that are associated with a memory location including a device identifier corresponding to the user device from which the user seeks to view the dashboard user interface. In this manner, the display of the web-based applications corresponding to the application information is device-specific. Similarly, the association between the memory locations including the application information and the customization information allow the positioning of the web-based applications and the positioning of the secure information within the web-based application to be device-specific.

Figure 6:
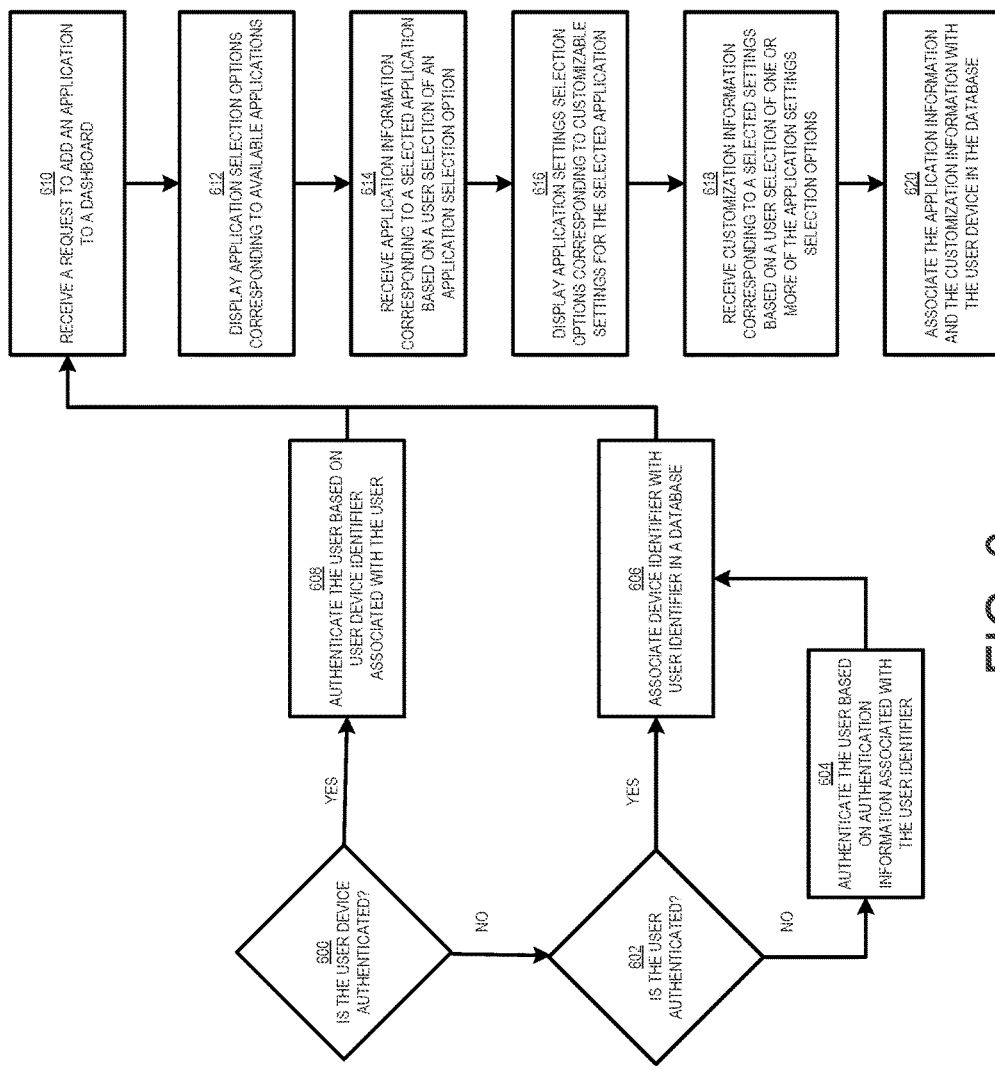
FIG. 6 is a flow chart of an example of a process for creating database associations to display secure information from multiple sources on the dashboard user interface of FIG. 5 according to one aspect of the present disclosure.

FIG. 6 is a flow chart of an example of a process for creating database associations to display secure information from multiple sources on the dashboard user interface of FIG. 5 according to one aspect of the present disclosure. The process is described with respect to FIGS. 1-4, though other implementations are possible.

In decision block 600, the integration server device 102 determines whether a user device 110A, 110B, 110C is authenticated to access the integration system 100. The determination may be in response to an attempt or request by a user operating the user device 110A to access the integration system 100 via the network 112. In some aspects, the integration server device 102 may generate a user interface including selection options (e.g., a hyperlinked button or text) for accessing secure information from the application systems 106A, 106B, 106C via a dashboard user interface. Upon attempting to access the integration system 100, the user device 110A may transmit a device identifier or other unique information related to the user device 110A to allow the integration system 100 to identify the user device 110A. In some aspects, the integration server device 102 may determine whether the user device 110A is authenticated based on device information stored in the database device 104. For example, the integration server device 102 may request or retrieve information associated with the user from the database device 104 to determine if the information contains device information matching the device identifier or other information transmitted from the device.

In block 602, the integration server device 102 authenticates the user based on the device information. The integration server device 102 may authenticate the user if there is a match between the device identifier transmitted by the user device 110A and the device information stored in the database device 104. The memory location of the matching device identifier may be determined and an associated memory location including a user identifier may be used to identify the user authorized to view the secure information.

In decision block 604, the integration server device 102 determines whether the user is authenticated to access the integration system 100 subsequent to a determination that the user device is not authenticated. The integration server device 102 may determine whether the user is authenticated based on previous transmissions by the user to the integration server device 102. For example, the user may access the integration system 100 from one of the application systems 106A, 106B, 106C where the user was previously authenticated. The integration server device 102 may determine that that user is authenticated on the integration system 100 based on the prior authentication of the user on an application system 106A, 1066, 106C.

Figure 7:
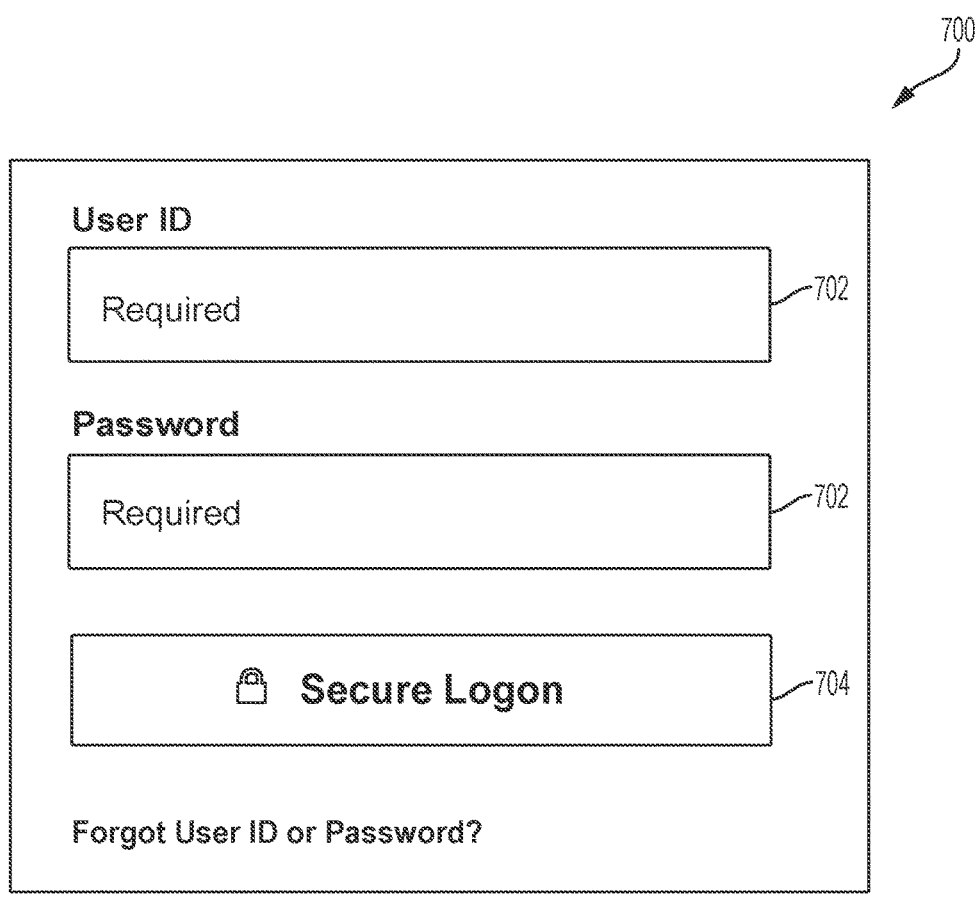
FIG. 7 is an example of a user interface for authenticating a user to view a dashboard user interface according to one aspect of the present disclosure.

In block 606, the integration server device 102 authenticates the user based on authentication information associated with the user. The integration server device 102 may receive the authentication information in response to a user interface generated by the integration server device 102 to allow the user to enter the authentication information. The authentication information may include a username, account number, password, personal identification number, or other information unique to the user to authenticate that the user is permitted to view the secure information from the application systems 106A, 1066, 106C on the user device 110A. For example, FIG. 7 shows a user interface 700 that may be generated by the integration server device 102 to allow the user to enter authentication information for accessing the integration system 100. The user interface may include input options 702 to allow the user to enter alphanumeric text from the user device 110A corresponding to a user identifier ("user id") and a password unique to the user. The authentication information may ensure that the user is authorized to view the secure information from the application systems 106A, 106B, 106C. Subsequent to a user selection of the selection option 704, the user device 110A may transmit the authentication information to the integration server device 102 via the network 112. The integration server device 102 may transmit the authentication information to the integration server device 102 for authenticating the user.

Returning to FIG. 6, in block 608, the integration server device 102 associates device information with the user identifier in the database device 104. The device information may include a device identifier or other unique device information corresponding to the user device 110A from which the user is attempting to access the integration system 100. In some aspects, the device information may be automatically transferred to the integration system 100 with the authentication information entered by the user on the user device 110A. The integration server device 102 may associate the device information with the user by storing the device identifier in a memory location that is associated with a memory location including the user identifier. In some aspects, the association of the device identifier with the user identifier may allow the integration server device 102 to authenticate the user based on the authentication of the user device 110A as described in block 600. In additional aspects, the association of the device identifier with the user identifier may also allow the user to integration server device 102 or the user to selectively share secure information on a dashboard user interface based on which user device 110A, 1106, 110C is being used to access the integration system 100.

In block 610, the integration server device 102 receives a request from the user to add a web-based application to a dashboard. The request may be subsequent to authentication of the user as described in block 602 or authentication of the user and the user device 110A as described in blocks 606 and 608. Following authentication of the user, the integration server device 102 may generate a user interface including a dashboard for display on the user device 110A. The dashboard user interface may display secure information related to the user and corresponding to information from the application systems 106A, 106B, 106C. The secure information may be retrieved from the database devices 108A, 108B, 108C of the application systems 106A, 106B, 106C as described in block 506 of FIG. 5. The secure information may be displayed using web-based applications corresponding to the application systems 106A, 106B, 106C. In some aspects, the dashboard may include one or more selection options for transmitting a request to the integration server device 102 to add a web-based application to the dashboard.

Figure 8:
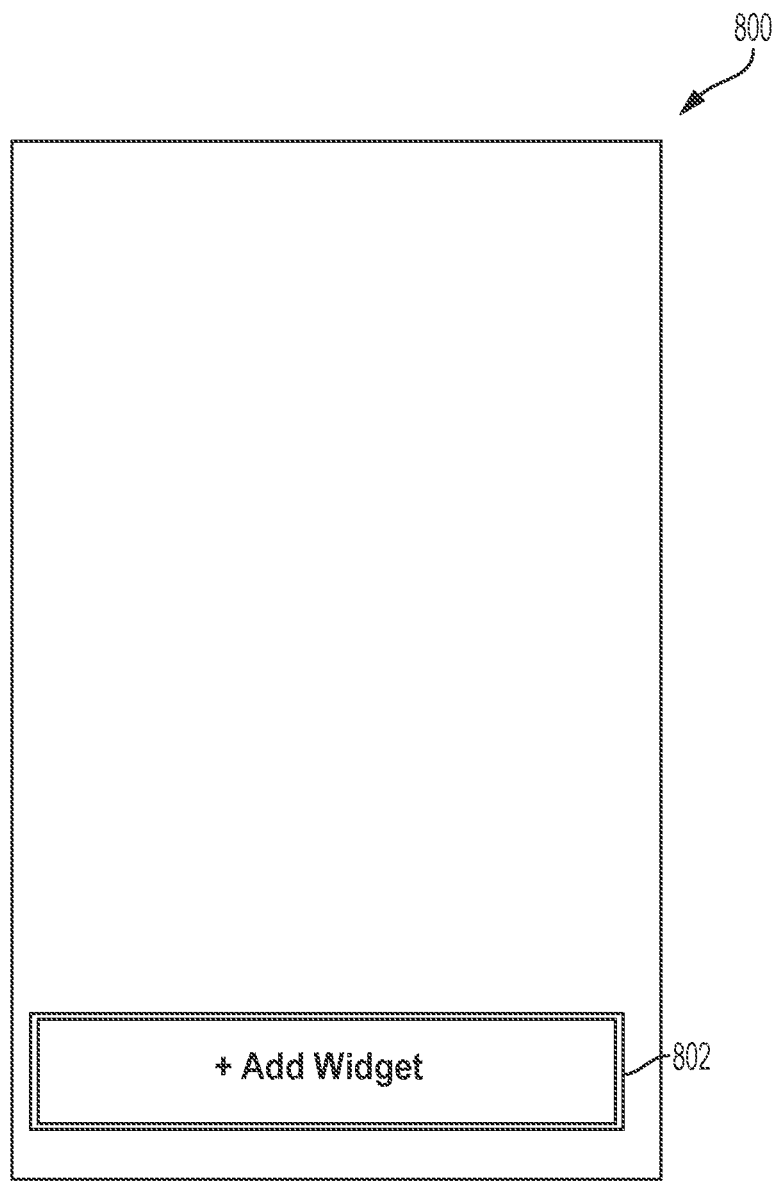
FIG. 8 is an example of a user interface for requesting a web-based application on a dashboard user interface according to one aspect of the present disclosure.

For example, FIG. 8 shows an example of a user interface 800 generated by the integration server device 102 including a dashboard with a selection option 802, labeled "+Add Widget," to allow the user to select a web-based application for display on the dashboard user interface. The user may choose this selection option to transmit a request to add a web-based application to the dashboard user interface.

Returning to FIG. 6, in block 612, the integration server device 102 may generate a user interface including selection options corresponding to web-based applications that may be displayed on the dashboard user interface. The display may be in response to a request from the user device 110A via the network 112 as described in block 610. The request may be in the form of a command or other data transmitted electronically or optically from the user device 110A in response to a selection by the user to add a web-based application to the dashboard. The web-based applications may represent secure information retrieved from an application system 106A, 106B, 106C communicatively coupled to the integration system 100.

Figure 9:
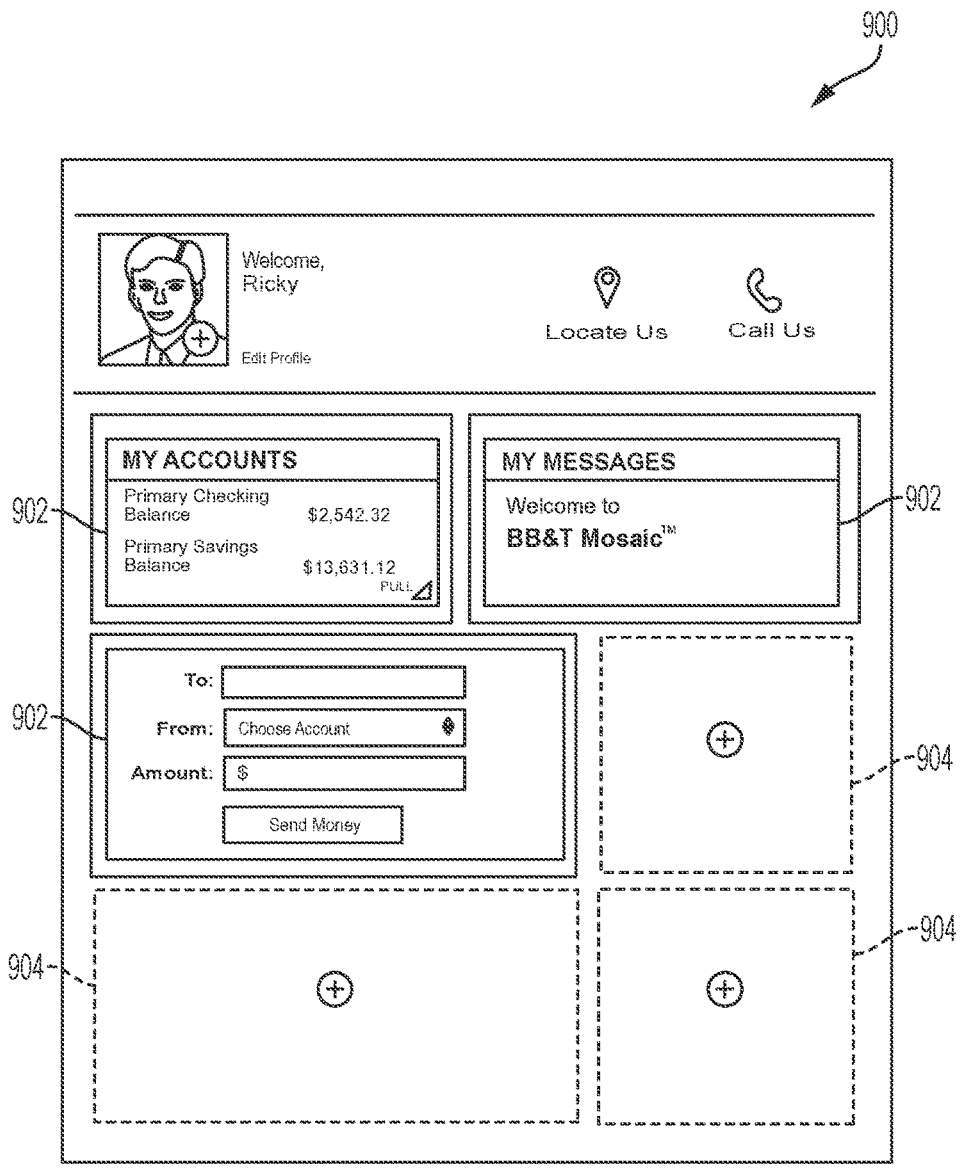
FIG. 9 is an example of a user interface for adding a web-based application to a dashboard user interface according to one aspect of the present disclosure.
Figure 10:
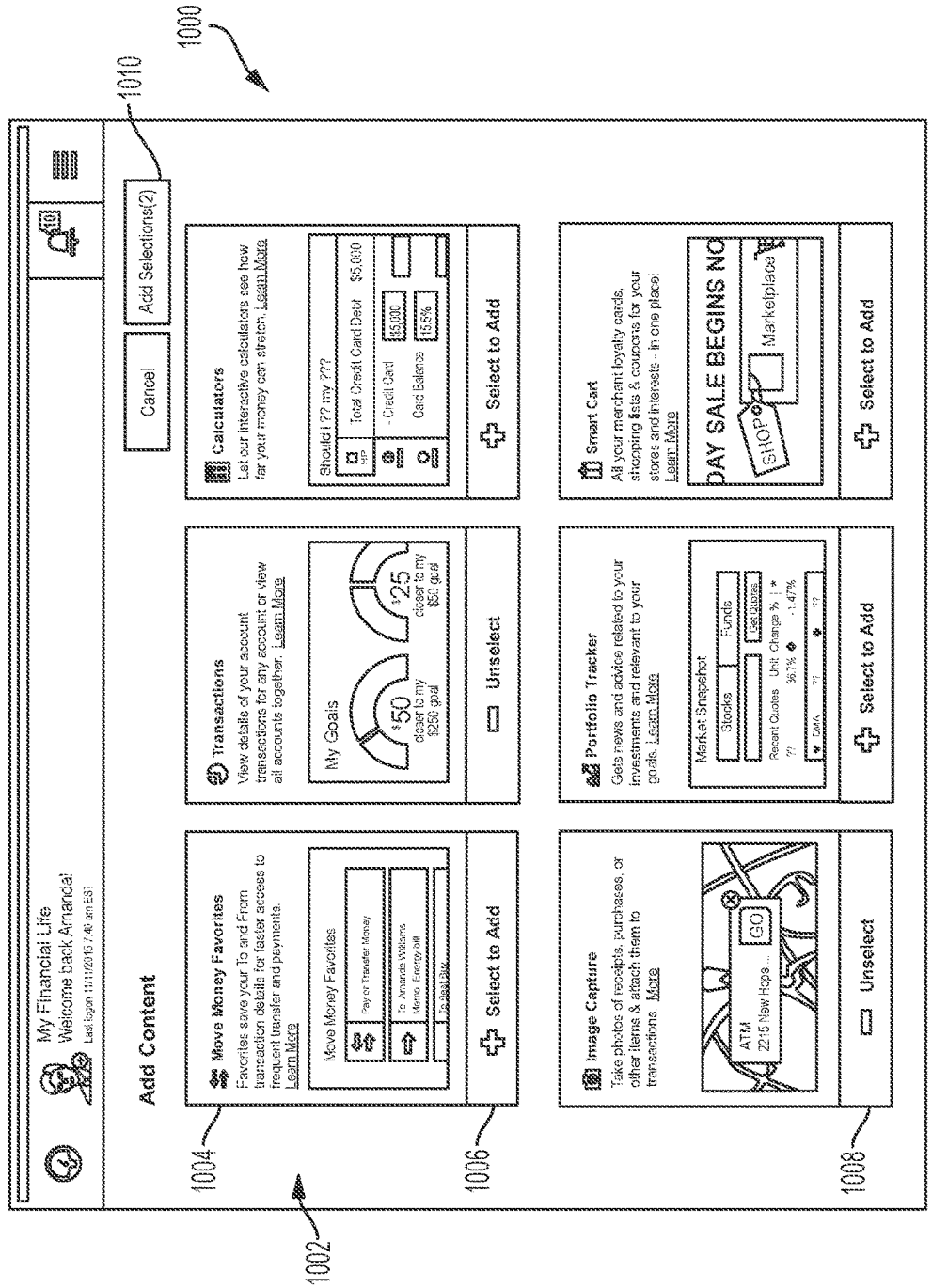
FIG. 10 is an example of a different user interface for adding a web-based application to a dashboard user interface according to one aspect of the present disclosure

FIGS. 9 and 10 show examples of user interfaces 900, 1000 with selection options for adding a web-based application to a dashboard user interface. In FIG. 9, the user interface 900 includes previously selected applications 902 and selection options 904 that the user may select to add additional web-based applications to the dashboard user interface. Similarly, in FIG. 10, user interface 1000 shows icons 1002. The icons correspond to each of the web-based applications available to add to the dashboard user interface. The icons include a description 1004 describing the web-based application. The icons also include selection options 1006, 1008. Selection options 1006 may be selected by the user to add the web-based application corresponding to the icon 1002 to the dashboard user interface. Selection option 1008 may be selected by the user to remove a web-based application corresponding to the icon. In the user interface 900, multiple web-based applications may be added or removed from the dashboard user interface at once. Subsequent to the user determining which web-based applications to add and remove from the dashboard user interface, the user may select selection option 1010 to update the dashboard user interface.

Returning to FIG. 6, in block 614, the integration server device 102 receives application information corresponding to the selected web-based application. The application information may be received as an input in response to a selection of the option corresponding to the selected web-based application as described for block 612. In some aspects, the application information may include information related to the type of secure information to be retrieved. For example, the application information may allow the integration server device 102 to determine from which of the application systems 106A, 106B, 106C and which database device 108A, 108B, 108C to retrieve the secure information. In additional and alternative aspects, the application information may include templates or other information related to the presentation of the selected web-based application (e.g., size, shape, titles, descriptions, etc.) for the web-based application.

In block 616, the integration server device 102 may generate one or more user interfaces to display settings selection options corresponding to the data for the selected web-based application. In some aspects, the display of the settings selection options may be in response to the selection of the web-based application. In additional aspects, the display of the settings selection options may be in response to a selection of an option to allow the user to define or edit the settings for the selected web-based application. For example, the selection of a web-based application may result in the display of the selected web-based application on the dashboard user interface having default settings for the user device or settings determined by the user in the corresponding application system. The selection of the web-based application from the dashboard may allow the user to change the settings to customized settings according to the user's preferences.

Figure 11:
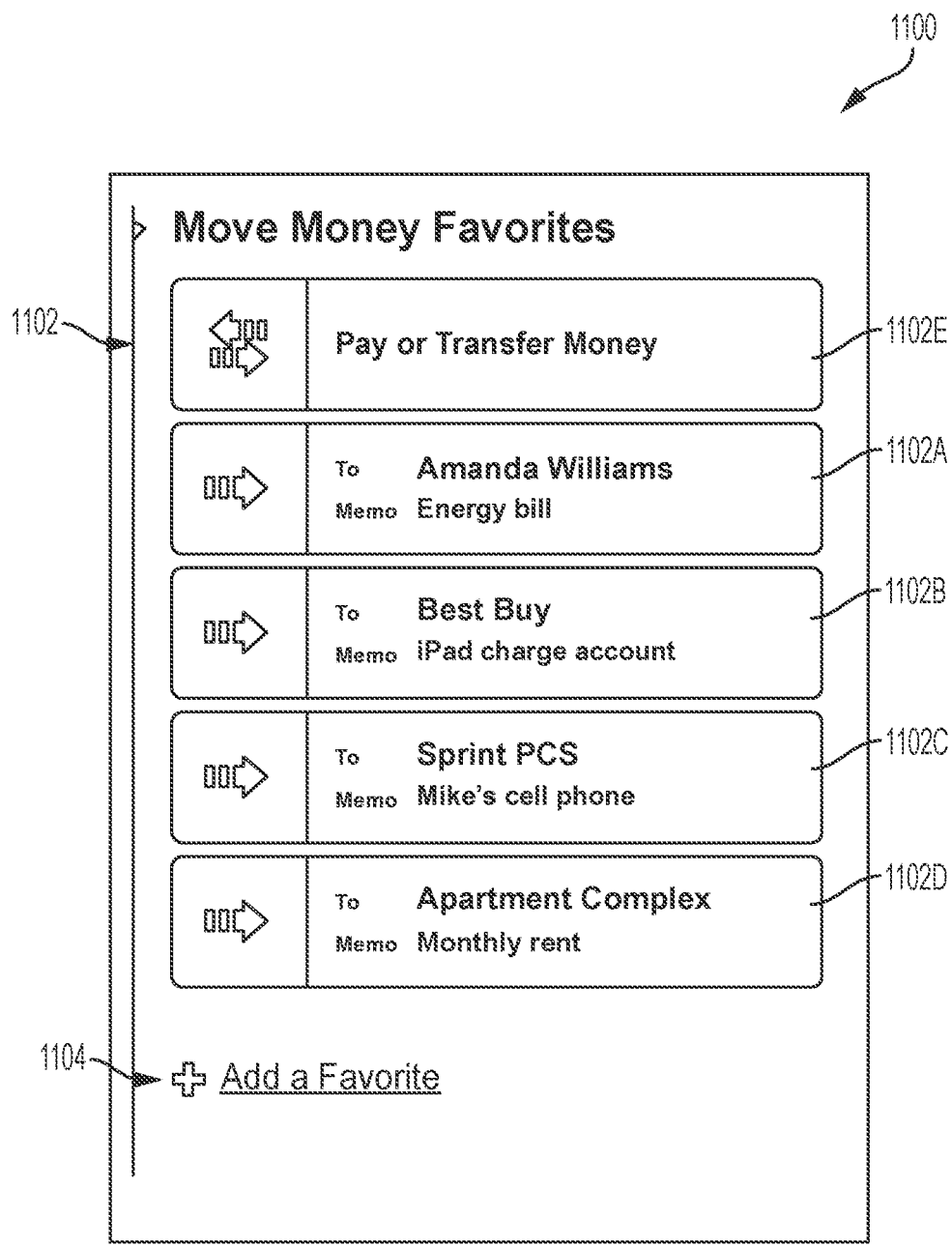
FIG. 11 is an example of a web-based application for display on a user device according to one aspect of the present disclosure.
Figure 12:
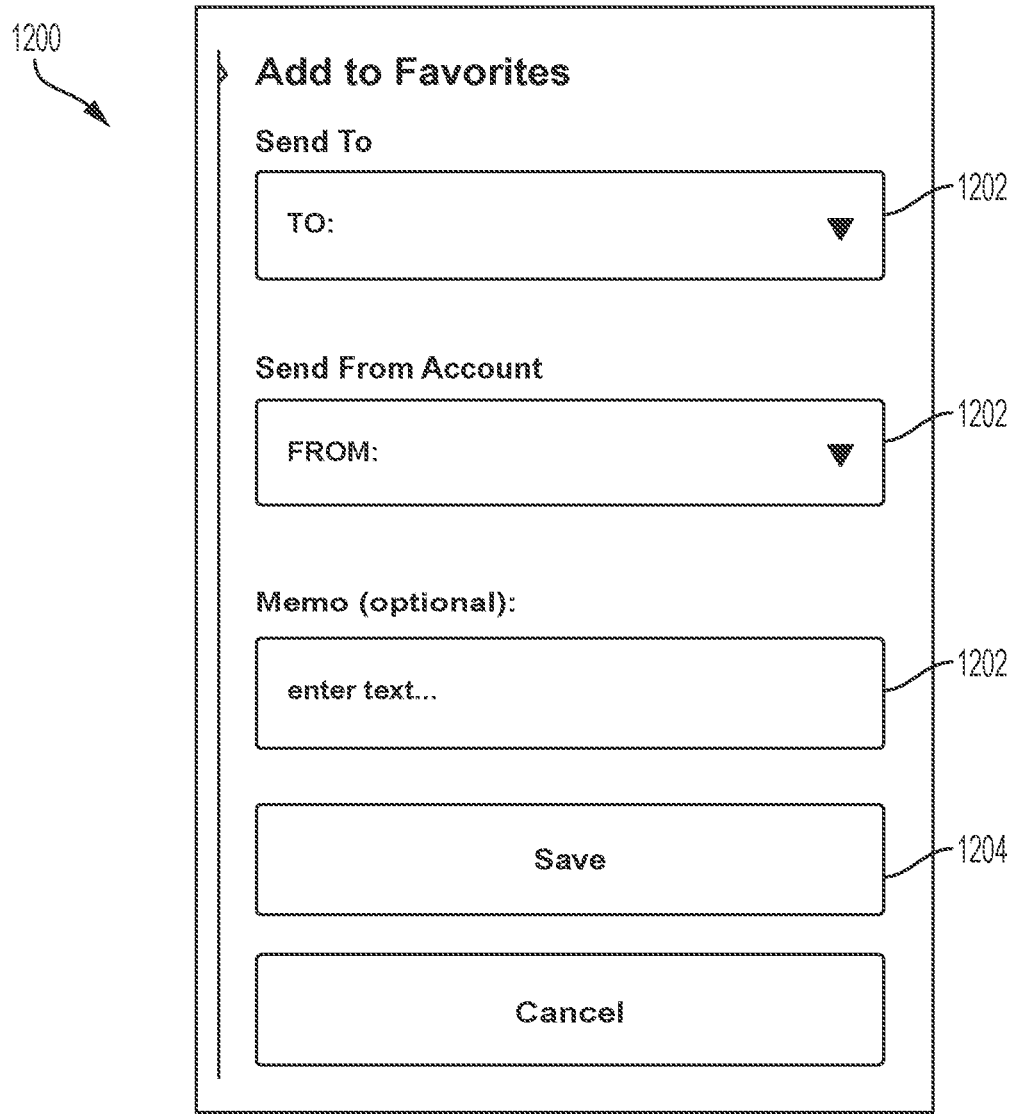
FIG. 12 is an example of a user interface for customizing the web-based application of FIG. 11 according to one aspect of the present disclosure.

FIGS. 11 and 12 show examples of user interfaces 1100, 1200 in which the user may choose the settings for a web-based application. In FIG. 11, user interface 1100 shows an example of a user interface that may be generated by the integration server device 102 to allow the user to choose settings for the selected web-based application. User interface 1100 relates to a "Move Money Favorites" web-based application. The "Move Money Favorites" web-based application corresponds to the icon 1002 described in the description 1004 of FIG. 10. The web-based application displays secure information 1102 corresponding to different transaction pairings for a transaction (e.g., a transfer of money). Specifically, the secure information 1102 is displayed as different selection options 1102A-1102E that may be selected by the user to initiate a transaction involving secure information between a source account and a recipient account designated and stored by the user. The selection options 1102A-1102D correspond to predefined "favorites" that indicate a source account and a recipient account for the transaction. Selection option 1102E corresponds to a transaction in which the user may designate the source and recipient accounts. In some aspects, to customize or change the settings for the web-based application, the user may select the hyperlink 1104 labeled "+Add a Favorite."

In response to a selection of the hyperlink 1104, the integration server device 102 may generate user interface 1200 that allows the user to designate a new transmission pairing that may be stored in a database device 108A, 108B, 108C of an application system 106A, 106B, 106C corresponding to the "Move Money Favorites" application. The user interface includes selection options 1202 that allow the user to select a source account (e.g., "From:") and a recipient account (e.g., "To:") and to enter alphanumeric text for display in the selection option corresponding to the transmission pairing. To submit the settings changes, the user may select the selection option 1204.

Figure 13:
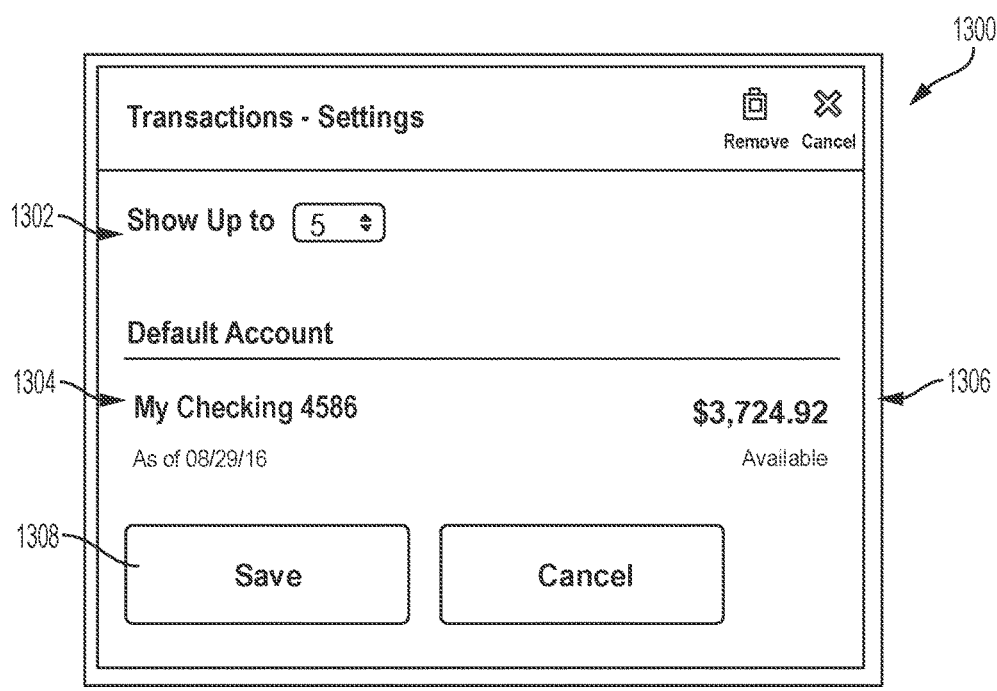
FIG. 13 is an example of a user interface for customizing a web-based application for display on a user device according to one aspect of the present disclosure.

FIG. 13 is an example of a user interface 1300 that may also be used to adjust settings. In the user interface 1300, a selection option 1302 allows the user to define a number of transactions involving secure information that may be displayed on the associated web-based application. The user interface 1300 also includes secure account information 1304, 1306 that may define a database device 108A, 108B, 108C in which the information is stored. In some aspects, the account information 1304 may be selected or by the user. In other aspects, the account information is a default setting. To submit the setting changes, the user may select the selection option 1308.

Returning to FIG. 6, in block 618, the integration server device 102 may receive customization information from the user device 110A. The customization information may correspond to settings changes and selections and be transmitted electronically or optically from the user device 110A in response to a selection by the user.

In block 620, the integration server device 102 associates the application information and the customization information with the user device 110A in the database device 104. The association may be made by saving the application information and the settings information in the database in designated memory locations that are associated in the database.

Figure 14:
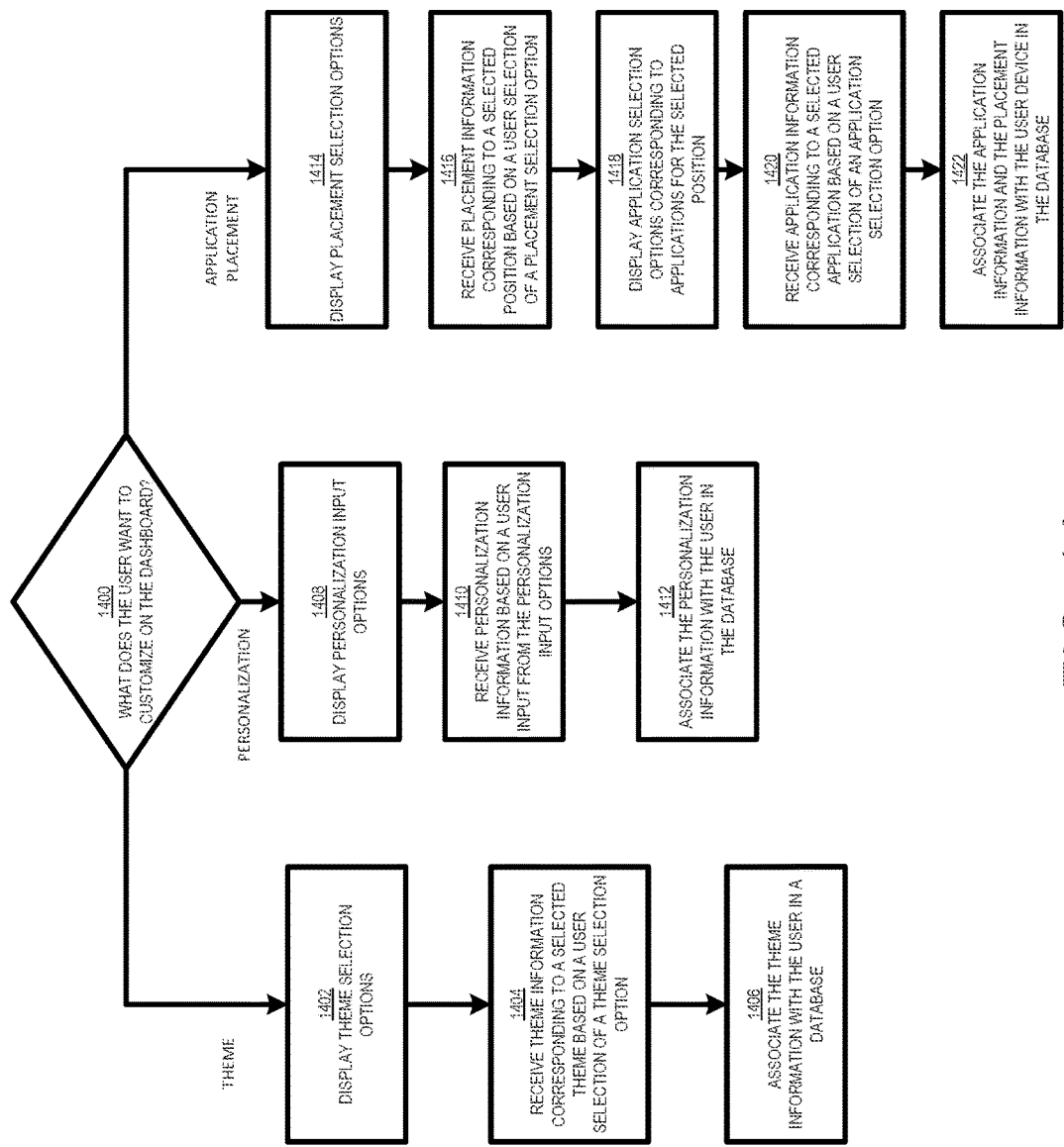
FIG. 14 is a flow chart of an example of a process for storing user-specific and device-specific information for customizing a dashboard user interface according to one aspect of the present disclosure.

FIG. 14 is a flow chart of an example of a process for storing user-specific and device-specific information for customizing a dashboard user interface according to one aspect of the present disclosure. The process is described with respect to the system and components of FIGS. 1-4, though other implementations are possible without departing from the scope of the present disclosure.

The integration system 100 may allow a user to customize the dashboard user interface according to preferences by the user for the display of the web-based applications on the dashboard. Customization may include, but may not be limited to, changing the theme in which the dashboard is presented, personalizing the dashboard by including personal information corresponding to the user (and separate from the secure information displayed in the web-based applications) for display on the dashboard, placing the web-based applications in specific positions on the dashboard, and the determining the settings information corresponding to each web-based application. In some aspects, the customization information provided may be user-specific such that the customized components will be visible on the dashboard when viewed from any user device 110A, 110B, 110C. In further aspects, the customization information may be device-dependent such that the customized components may be visible only one or more of user devices 110A, 110B, 110C.

In decision block 1400, the integration server device 102 determines which component of the dashboard the user wants to customize. In some aspects, the determination may be based on a selection received from the user. Based on the selection, the integration server device 102 may display an appropriate user interface corresponding to the component of the dashboard to be customized.

In block 1402, the integration server device 102 generates a user interface to display selection options corresponding to available themes for the dashboard user interface. The user interface may be generated in response to a user selection for determining or changing the theme of the dashboard. The theme of the dashboard may relate to the style and overall appearance of the dashboard. For example, the theme may relate to the size, font, and color of the text displayed in the dashboard and web-based applications, the background colors or shading for the dashboard and web-based applications, the zoom level or size of the web-based applications, or any other design components of the dashboard.

In block 1404, the integration server device 102 receives theme information corresponding to a selected theme. The theme information may be received in response to the selection of a selection corresponding to a desired theme. The theme information may include one or more of the design components individually or a package of components packed chosen as an overall theme for the dashboard user interface.

In block 1406, the integration server device 102 associates the theme with the user in the database device 104. For example, the theme information may be stored as display information in memory locations 308 of FIG. 3. Since the memory locations 308 are associated with the user identifiers stored in memory locations 300, the theme may be associated with the user. In this manner, the theme information may be user-specific and may displayed on any user device 110A, 110B, 1103 from which the user access the integration system 100.

In block 1408, the integration server device 102 generates a user interface to display input options corresponding to personalization information that may be entered by the user. The user interface may be generated in response to a user selection for determining or changing the personalization information displayed on the dashboard user interface. The personalization information of the dashboard user interface may relate to personal information about the user separate from the secure information stored in the database devices 108A, 108B, 108C. The personalization information may personalize the dashboard user interface with identifying information corresponding to the user to provide a more intimate user experience. For example, the personalization information may include a name associated with the user. The name may be the user's legal name, nickname, or any moniker entered by the user. In some aspects, the integration system 100 may display a name stored as user information in the database device 104 as a default and include a selection option to allow the user to modify the displayed name (e.g., change Robert to "Bob"). In some aspects, the personalization information that may be displayed and modified may also include a picture uploaded by the user. The picture may include a profile picture showing the face of the user, or may be a design or image selected and uploaded by the user for display on the dashboard user interface upon viewing.

In block 1410, the integration server device 102 receives the personalization information. The personalization information may be received in response to an input or selection by the user of the personalization information. In some aspects, the integration server device 102 may generate user interfaces having options to select from personal information previously stored in the database device 104 as user information. The user may select one or more of the options for display on the dashboard. In additional and alternative aspects, the user interface may include input options or selection options for inputting or editing text (e.g., a moniker) or for uploading or selecting an image for display on the dashboard. The selection may cause a transmission of the selected personalization information to the integration server device 102.

In block 1412, the integration server device 102 associates the personalization information with the user in the database device 104. The integration server device 102 may associate the personalization information with the user by storing the personalization information in a memory location associated with a memory location including the user identifier corresponding to the user. For example, the personalization information may be stored as display information in the memory locations 308 of FIG. 3.

In block 1414, the integration server device 102 may display selection options corresponding to positions where a web-based application may be placed on the dashboard. In some aspects, the selection options may be displayed on the dashboard in the position corresponding to where the web-based application may be placed if selected. For example, returning to user interface 900 of FIG. 9, the dashboard user interface including selection options 904, labeled "+Add," and bordered by dashed lines defining a placement of a web-based application. The user may select one of the selection options to transmit placement information corresponding to the position of the selection option chosen.

In block 1416, the integration server device 102 receives the placement information. For example, the personalization information may be received in response to a user selection of a selection option 904 of FIG. 9 as described in block 1416.

In block 1418, the integration server device 102 displays web-based application selection options corresponding to web-based applications available for placement in the selected position. In some aspects, the web-based application may be selected as described with respect to block 612 of FIG. 6. A selection of the option corresponding to a desired web-based application may cause a transmission of application information corresponding to the selected web-based application to the integration server device 102.

In block 1420, the integration server device 102 receives the application information corresponding to the selected web-based application. The application information may be received as an input in response to a selection of the option corresponding to the selected web-based application as described with respect to block 614 of FIG. 6.

In block 1422, the integration server device 102 associates the application information and the placement information with the user device in the database device 104. The association may be made by saving the application information and the placement information in the database device in a memory location that is associated with a memory location including the device identifier corresponding to the device from which the user is accessing the integration system. For example, the placement information may be stored as customization information in the memory locations 306 which are associated with the memory locations 304 having application information. In this manner, the placement information may be device-specific.

In additional and alternative aspects, the process steps of blocks 1414-block 1420 may be similarly used to determine the placement or order of secure information with a web-based application. For example, the integration server device 102 may generate one or a series of user interfaces to allow the user to designate how many and in what order a set of secure information may be displayed. The selections may be stored as customization information in the database device 104 in a memory location associated with the device identifier and application information as described in block 1420.

Figure 15:
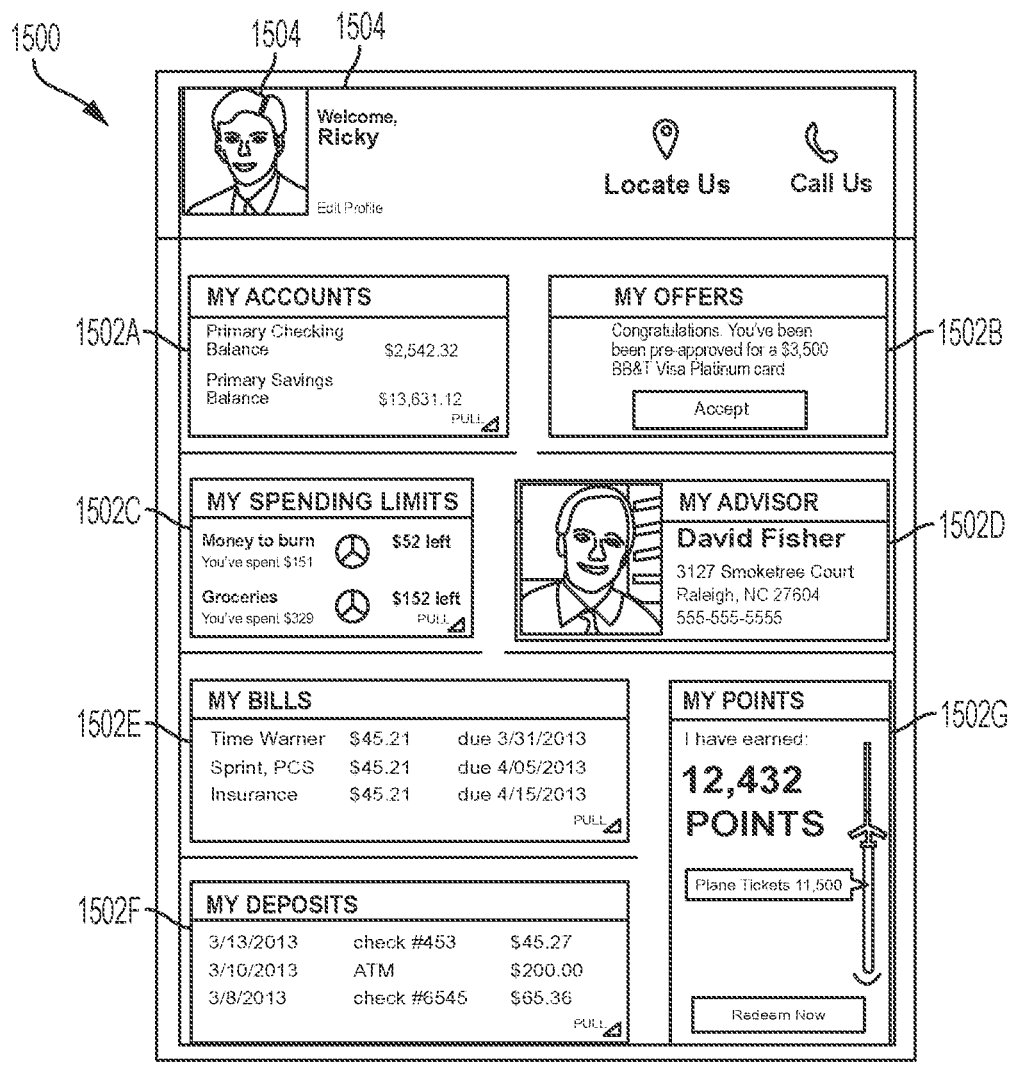
FIG. 15 is an example of a user interface displaying a dashboard user interface on a user device according to one aspect of the present disclosure

FIG. 15 shows an example of a dashboard user interface 1500 displaying secure information on a user device according to some aspects of the present disclosure. The dashboard user interface 1500 includes a number of web-based applications 1502A-1502G. The web-based applications include secure information corresponding to the user. For example, application 1502A displays account information for a primary checking and a primary savings account. In some aspects, the order in which the secure information is displayed may be dependent on customization information associated with the application information for the application 1502A displays account information for a primary checking and a primary savings account. The order in which the secure information is displayed may be dependent on customization information associated with the application information for the application 1502A in the database. In further aspects, the specific information displayed for each account (e.g., balances) may also be dependent on customization information. In some aspects, the secure information shown may not be directly sensitive to the user, but may be based on sensitive information. For example, application 1502B shows an offer available to the user. The offer may be based on sensitive secure information, such as credit scores and account balances.

The dashboard user interface 1500 also includes personalized information 1504. The personalization information includes an image of the user and a moniker associated with the user (e.g., the nickname "Ricky"). In some aspects, the personalization information may be user-specific and not device-specific such that it is displayed on each user device from which the user accesses the integration information, even if the web-based applications 1502A-1502G are different on each user device.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. For example, any particular feature, structure, operation, or other characteristic described in this specification in relation to one example or implementation may be combined with other features, structures, operations, or other characteristics described in respect of any other example or implementation. In addition, the use of "or" in the description is intended to be used in the inclusive sense unless explicitly noted otherwise. The illustrative examples described above are given to introduce the reader to the general subject matter discussed here and are not intended to limit the scope of the disclosed concepts.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A system, comprising:
a processor coupled to a database having a plurality of memory locations; and
a memory device accessible to the processor and comprising instructions that are executable by the processor to cause the processor to:
 receive a user request from a user device via a network, the user request being for obtaining secure user information related to a user of the user device; and
 in response to receiving the user request:
  determine that the user device has a device identifier among a plurality of device identifiers stored in a first set of memory locations in the database, wherein the plurality of device identifiers are for a plurality of user devices of the user;
  determine a first association between the first set of memory locations and a second set of memory locations in the database;
  based on determining the first association between the first set of memory locations and the second set of memory locations, retrieve application information for a plurality of web-based applications from the second set of memory locations in the database, the plurality of web-based applications including at least one banking application;
  determine a second association between the second set of memory locations and a third set of memory locations in the database;
  based on determining the second association between the second set of memory locations and the third set of memory locations, retrieve customization information for each web-based application among the plurality of web-based applications from third set of memory locations, the customization information for each web-based application being user customizable and identifying both a location on a dashboard user interface to display the web-based application and a position within the web-based application at which to display a respective portion of the secure user information that is accessible via the web-based application;
  request the secure user information from a plurality of different systems corresponding to the plurality of web-based applications, the plurality of different systems being separate from and communicatively coupled to the system for providing the secure user information to the system;
  receive the secure user information from the plurality of different systems; and
  in response to receiving the secure user information from the plurality of different systems, generate the dashboard user interface for display on the user device, the dashboard user interface comprising the plurality of web-based applications spatially positioned within the dashboard user interface in locations determined based on the customization information and respective types of secure information associated with the plurality of web-based applications, wherein the secure user information is spatially positioned within the plurality of web-based applications in accordance with the customization information.

2. The system of claim 1, wherein the memory device further comprises instructions that are executable by the processor to cause the processor to generate one or more user interfaces for receiving the customization information as user input, the one or more user interfaces including one or more selection options positioned at available locations for the plurality of web-based applications, the one or more selection options being selectable by the user via the user device to cause the processor to store a selected available location as customization information for a selected web-based application information in the database.

3. The system of claim 1, wherein the memory device further comprises instructions that are executable by the processor to cause the processor to generate one or more user interfaces for receiving the customization information as user input, the one or more user interfaces including one or more selection options selectable by the user via the user device to identify a quantity corresponding to an amount of the secure user information to display for a web-based application of the plurality of web-based applications.

4. The system of claim 1, wherein the dashboard user interface further includes personalized information corresponding to at least one of a color theme, a moniker of the user, or a user-selected image; and
wherein the personalization information corresponds to display information stored in a fourth set of memory locations associated with a separate memory location including a user identifier of the user, the separate memory location being separate from the first set of memory locations.

5. The system of claim 1, wherein the user request is a first user request, the user device is a first user device, and the dashboard user interface is a first dashboard user interface; and wherein the memory device further comprises instructions that are executable by the processor to cause the processor to:
receive a second user request from a second user device among the plurality of user devices; and
in response to receiving the second user request, generate a second dashboard user interface for display on the second user device based on a second device identifier of the second user device, the second dashboard user interface having at least one web-based application positioned in a different spatial location in the second dashboard user interface than in the first dashboard user interface.

6. The system of claim 1, wherein the memory device comprises instructions that are executable by the processor to cause the processor to request the secure user information from the plurality of different systems by identifying the plurality of different systems based on application identifiers corresponding to the plurality of different systems.

7. The system of claim 1, wherein at least one web-based application of the plurality of web-based applications displayed on the dashboard user interface includes one or more selection options that allow the user to interact with a corresponding application system of the plurality of different systems from the dashboard user interface.

8. A method, comprising:
receiving, by a processor of a system, a user request from a user device via a network, the user request being for obtaining secure user information related to a user of the user device; and
in response to receiving the user request:
determining, by the processor, that the user device has a device identifier among a plurality of device identifiers stored in a first set of memory locations in a database, wherein the plurality of device identifiers are for a plurality of user devices of the user;
determining, by the processor, a first association between the first set of memory locations and a second set of memory locations in the database;
based on determining the first association between the first set of memory locations and the second set of memory locations, retrieving, by the processor, application information for a plurality of web-based applications from the second set of memory locations in the database, the plurality of web-based applications including at least one banking application;
determining, by the processor, a second association between the second set of memory locations and a third set of memory locations in the database;
based on determining the second association between the second set of memory locations and the third set of memory locations, retrieving, by the processor, customization information for each web-based application among the plurality of web-based applications from third set of memory locations, the customization information for each web-based application being user customizable and identifying both a location on a dashboard user interface to display the web-based application and a position within the web-based application at which to display a respective portion of the secure user information that is accessible via the web-based application;
requesting, by the processor, the secure user information from a plurality of different systems corresponding to the plurality of web-based applications, the plurality of different systems being separate from and communicatively coupled to the system for providing the secure user information to the system;
receiving, by the processor, the secure user information from the plurality of different systems; and
in response to receiving the secure user information from the plurality of different systems, generating, by the processor, the dashboard user interface for display on the user device, the dashboard user interface comprising the plurality of web-based applications spatially positioned within the dashboard user interface in locations determined based on the customization information and respective types of secure information associated with the plurality of web-based applications, wherein the secure user information is spatially positioned within the plurality of web-based applications in accordance with the customization information.

9. The method of claim 8, further comprising:
generating, by the processor, one or more user interfaces including one or more selection options positioned at available locations for the plurality of web-based applications;
receiving, by the processor, a selection of a selection option of the one or more selection options corresponding to a selected available location of the available locations for the plurality of web-based applications; and
storing in the database, by the processor, the selected available location as customization information for a selected web-based application of the plurality of web-based applications.

10. The method of claim 8, further comprising:
generating, by the processor, one or more user interfaces including one or more selection options for selecting a quantity corresponding to an amount of the secure user information to display for a web-based application of the plurality of web-based applications;
receiving, by the processor, a selection of a selection option corresponding to a desired quantity; and
storing in the database, by the processor, the desired quantity as customization information for a selected web-based application of the plurality of web-based applications.

11. The method of claim 8, further comprising, in response to receiving the user request from the user device, authenticating the user to view the dashboard user interface on the user device by identifying a user identifier stored in a separate memory location that is separate from but associated with a memory location including the device identifier for the user device, the memory location being within the first set of memory locations.

12. The method of claim 8, further comprising:
receiving, from the user via the user device, personalization information corresponding to at least one of a color theme, a moniker, or an image; and
storing the personalization information in a fourth set of memory locations, the fourth set of memory locations being associated with a separate memory location including a user identifier for the user, the separate memory location being separate from and associated with the first set of memory locations,
wherein generating the dashboard user interface includes positioning the personalization information on the dashboard user interface.

13. The method of claim 8, wherein the user request is a first user request, the user device is a first user device, the customization information is first customization information, and the dashboard user interface is a first dashboard user interface; and further comprising:
receiving a second user request to receive the secure user information from a second user device; and
in response to receiving the second user request:
determining that the second user device has a second device identifier among the plurality of device identifiers stored in the database and related to the user; and
based on the second user device having the second device identifier, generating a second dashboard user interface that is different from the first dashboard user interface for display on the second user device, wherein the second dashboard user interface includes at least one web-based application that is absent from the first dashboard user interface or positioned in a different spatial location than in the first dashboard user interface.

14. The method of claim 8, further comprising identifying the plurality of different systems based on application identifiers corresponding to the plurality of different systems.

15. The method of claim 8, wherein at least one web-based application of the plurality of web-based applications displayed on the dashboard user interface includes one or more selection options that allow the user to interact with a corresponding application system of the plurality of different systems from the dashboard user interface.

16. A non-transitory computer-readable medium comprising program code that is executable by a processor of a system for causing the processor to:
receive a request from a user device of a user via a network, the request being for accessing a dashboard user interface configured to be displayed on the user device; and
in response to receiving the request:
determine that the user device has a device identifier among a plurality of device identifiers stored in a first set of memory locations in a database, wherein the plurality of device identifiers are for a plurality of user devices of the user;
determine a first association between the first set of memory locations and a second set of memory locations in the database;
based on determining the first association between the first set of memory locations and the second set of memory locations, retrieve application information for a plurality of web-based applications from the second set of memory locations in the database, the plurality of web-based applications including at least one banking application;
determine a second association between the second set of memory locations and a third set of memory locations in the database;
based on determining the second association between the second set of memory locations and the third set of memory locations, retrieve customization information for each web-based application among the plurality of web-based applications from the third set of memory locations, the customization information for each web-based application being user customizable and identifying both a respective location on the dashboard user interface to display the web-based application and a position within the web-based application at which to display a respective portion of secure user information that is accessible via the web-based application;
request the secure user information from a plurality of different systems corresponding to the plurality of web-based applications, the plurality of different systems being separate from and communicatively coupled to the system for providing the secure user information to the system;
receive the secure user information from the plurality of different systems; and
in response to receiving the secure user information from the plurality of different systems, generate the dashboard user interface for display on the user device, the dashboard user interface comprising the plurality of web-based applications spatially positioned within the dashboard user interface in locations determined based on the customization information and respective types of secure information associated with the plurality of web-based applications, wherein the secure user information is spatially positioned within the plurality of web-based applications in accordance with the customization information.

17. The non-transitory computer-readable medium of claim 16, wherein the user device comprises a laptop computer, a desktop computer, a mobile phone, or a wearable device.

18. The non-transitory computer-readable medium of claim 17, further comprising program code that is executable by the processor for causing the processor to:
authenticate with the plurality of different systems corresponding to the plurality of web-based applications; and for each web-based application among the plurality of web-based applications, obtain the respective portion of the secure user information corresponding to the web-based application from a respective system among the plurality of different systems.

19. The non-transitory computer-readable medium of claim 17, further comprising program code that is executable by the processor for causing the processor to authenticate the user device to access the dashboard user interface based on the device identifier of the user device.

20. The non-transitory computer-readable medium of claim 17, further comprising program code that is executable by the processor for causing the processor to, prior to receiving the request:
   receive, from the user via the network, another request to customize the dashboard user interface; and
   in response to receiving the other request:
      generate a user interface for display to the user, the user interface being different from the dashboard user interface and including:
         a plurality of icons corresponding to a group of web-based applications capable of being included in the dashboard user interface, each icon in the plurality of icons including text describing a respective functionality of a respective web-based application in the group of web-based applications; and
         a plurality of selectable buttons for selecting which web-based applications in the group of web-based applications are to be included in the dashboard user interface, wherein at least two selectable buttons in the plurality of selectable buttons are capable of being selected concurrently in the user interface;
      receive, from the user through the user interface, a selection of the plurality of web-based applications from among the group of web-based applications for inclusion in the dashboard user interface; and
      generate the customization information based on the selection of the plurality of web-based applications.

\* \* \* \* \*